(12) United States Patent
Apps et al.

(10) Patent No.: US 7,512,623 B2
(45) Date of Patent: Mar. 31, 2009

(54) METHOD AND SYSTEM FOR THE VISUAL PRESENTATION OF DATA MINING MODELS

(75) Inventors: Eric Apps, Toronto (CA); Ken Ono, Toronto (CA)

(73) Assignee: Angoss Software Corporation, Toronto (CA)

( * ) Notice: Subject to any disclaimer, the term of this patent is extended or adjusted under 35 U.S.C. 154(b) by 531 days.

(21) Appl. No.: 10/743,324

(22) Filed: Dec. 23, 2003

(65) Prior Publication Data
US 2004/0215599 A1   Oct. 28, 2004

Related U.S. Application Data

(63) Continuation of application No. PCT/CA02/01044, filed on Jul. 8, 2002.

(60) Provisional application No. 60/303,036, filed on Jul. 6, 2001.

(51) Int. Cl.
G06F 7/00 (2006.01)
G06F 17/00 (2006.01)
G06F 17/30 (2006.01)

(52) U.S. Cl. .......................................... 707/102; 707/3
(58) Field of Classification Search ................ 707/3, 707/102
See application file for complete search history.

(56) References Cited

U.S. PATENT DOCUMENTS

| | | | |
|---|---|---|---|
| 6,052,710 A | 4/2000 | Saliba et al. | |
| 6,189,005 B1 | 2/2001 | Sarawagi et al. | |
| 6,236,978 B1 * | 5/2001 | Tuzhilin | 705/26 |
| 6,240,411 B1 * | 5/2001 | Thearling | 707/5 |
| 6,317,750 B1 | 11/2001 | Tortolani et al. | |
| 6,317,760 B1 | 11/2001 | Byrd et al. | |
| 6,347,307 B1 | 2/2002 | Sandhu et al. | |
| 6,356,906 B1 | 3/2002 | Lippert et al. | |
| 6,356,907 B1 | 3/2002 | Hopmann | |
| 6,529,909 B1 * | 3/2003 | Bowman-Amuah | 707/10 |
| 6,606,744 B1 * | 8/2003 | Mikurak | 717/174 |
| 6,636,860 B2 * | 10/2003 | Vishnubhotla | 707/100 |

(Continued)

FOREIGN PATENT DOCUMENTS

CA   2287030   4/2000

(Continued)

OTHER PUBLICATIONS

International Search Report for PCT/CA2002/01044, mailed Oct. 9, 2003.

(Continued)

Primary Examiner—James Trujillo
Assistant Examiner—Jorge A Casanova
(74) Attorney, Agent, or Firm—Joseph Conneely; McCarthy Tetrault LLP

(57) ABSTRACT

A method for delivering presentations associated with data mining models. The method includes the steps of: a) storing the data mining models and the presentations in a repository in a data mining system; b) associating ones of the data mining models with ones of the presentations through references within ones of the presentations; c) receiving a request from a user for a presentation; d) processing the request to determine an appropriate presentation corresponding to the request; the request including a customer identification; the request including an event identification; and, e) delivering the appropriate presentation to the user.

29 Claims, 25 Drawing Sheets

U.S. PATENT DOCUMENTS

| | | | |
|---|---|---|---|
| 6,697,088 B1 * | 2/2004 | Hollander | 715/744 |
| 7,007,029 B1 * | 2/2006 | Chen | 707/100 |
| 7,117,208 B2 * | 10/2006 | Tamayo et al. | 707/6 |
| 2001/0034748 A1 | 10/2001 | Bimson et al. | |
| 2001/0037345 A1 | 11/2001 | Kiernan et al. | |
| 2001/0037346 A1 * | 11/2001 | Johnson | 707/513 |
| 2001/0044812 A1 | 11/2001 | Byrd et al. | |
| 2001/0054172 A1 | 12/2001 | Tuatini | |
| 2002/0004830 A1 | 1/2002 | Hyatt et al. | |
| 2002/0023113 A1 | 2/2002 | Hsing et al. | |
| 2002/0026464 A1 | 2/2002 | Jones et al. | |
| 2002/0040469 A1 | 4/2002 | Pramberger | |
| 2002/0046273 A1 | 4/2002 | Lahr et al. | |
| 2002/0174182 A1 * | 11/2002 | Wilkinson et al. | 709/205 |

FOREIGN PATENT DOCUMENTS

| | | |
|---|---|---|
| CA | 2136300 | 5/2000 |
| CA | 2255047 | 5/2000 |
| CA | 2368089 | 9/2000 |
| CA | 2312597 | 1/2002 |
| WO | WO-99 13427 A | 3/1999 |
| WO | WO-01 33464 A | 5/2001 |

OTHER PUBLICATIONS

Manganaris, S. et al., "A Data Mining Analysis of RTID Alarms", Computer Networks, Elsevier Science Publishers B.V., Amsterdam, NL., vol. 34, No. 4, Oct. 2000, pp. 571-577.

Chen, M-S et al., "Data Mining: An Overview From the Database Perspective" IEEE Trans. on Knowledge and Data Engineering, IEEE Inc., NY, US, vol. 8, No. 6, Dec. 1996.

* cited by examiner

500c

A

| ASYS_UserGroups ||
|---|---|
| PK | ID |
| | GroupID<br>Description |

B

| ASYS_Users ||
|---|---|
| PK | ID |
| FK1,I1 | GroupID<br>UserID<br>SkinType<br>CurrentAppID<br>Description |

| ASYS_ComputeServer | |
|---|---|
| PK | ID |
| FK1 | ModelSourceID<br>ConnectionString |

G

| ASYS_ModelSource | |
|---|---|
| PK | ID |
|  | ModelSourceDesc |

ASYS_ModelInputLookupSP

| | |
|---|---|
| FK1 | ProjectModelID<br>StoredProcName<br>DBConnectString |

| ASYS_ProjectVisibility ||
|---|---|
| PK | ID |
| FK3,I3 | UserID |
| FK2,I2 | UserGroupID |
| FK1,I1 | ProjectID |
| | VisibilityType |
| | Description |
| | DateCreated |
| | DateUpdated |

D

| ASYS_ProcessLog ||
|---|---|
| PK | ID |
| FK2,I2 | UserID |
| FK1,I1 | ProjectID |
| | OSProcessID |
| | ProcessName |
| | Status |
| | Server |
| | XMLResults |
| | LogText |
| | StartDate |
| | EndDate |

| ASYS_Projects | |
|---|---|
| PK | ID |
| FK2,I2,U1<br>FK1,I1,U1<br>U1<br><br><br><br><br><br>U1 | ProjectTypeID<br>ApplicationID<br>ProjectDescription<br>DateCreated<br>StartDate<br>EndDate<br>LastUsed<br>LastUpdated<br>OwnerUserID<br>UsageCount<br>Version<br>XML |

| | ASYS_ModelInputLookup |
|---|---|
| | |
| FK1 | ProjectModelID ProgID |

840

M

| | ASYS_Applications | |
|---|---|---|
| PK | ID | |
| | AppPrefix AppName StartMenu StartPage DefaultComputeServer FilesPath DateCreated | |

FIG. 8 Cont'd

| ASYS_Model | |
|---|---|
| | |
| FK3 | ProjectModelID |
| FK1 | ModelSourceID |
| FK2 | ModelTypeID |
| | Dynamic |
| | RecordUse |
| | PredictionVariable |
| | PredictionValue |

H

820

| ASYS_ModelType | |
|---|---|
| PK | ID |
| | ModelTypeDesc |

| ASYS_Classifications | |
|---|---|
| PK | ID |
| FK1,I1 | ProjectID<br>Original<br>Include<br>Classification |

Y

| ASYS_RelmanPrecomputes |
|---|
| RelManViewProjectID<br>EntityID<br>Treatments<br>HTML |

— 880

O

| ASYS_ProjectType | |
|---|---|
| PK | ID |
| | Description<br>IsSystemType<br>CopyCapabilities<br>Shared<br>TrackChanges<br>DefaultVisibility<br>EditURL<br>ViewURL<br>AddURL<br>DeleteURL<br>RelatedProgID<br>FilesLocation |

| ASYS_Settings | |
|---|---|
| PK | ID |
| | Value |

Q

| ASYS_ExtAppInterface | |
|---|---|
| PK | ID |
| | BusinessObjectName<br>BusinessComponentName<br>ViewName<br>AppletName<br>ControlName<br>OtherObjectType<br>OtherObjectName<br>ObjectAction<br>ASYSLocator |

870

W

| ASYS_ModelInputLookupDynamic | |
|---|---|
| FK1 | ProjectModelID<br>TableName<br>EntIDColName<br>WhereClause<br>DBConnectString<br>ColumnName<br>ColumnAlias |

ASYS_Relmanusage

UserID
LocatorID
ProjectID
PresentationID
StartCalc
EndCalc

T

ASYS_Scores_10002

| I1 | ExternalEntityID |
|---|---|
|  | ProjectID<br>SingleScoreValue |

An Example Scores Table

| | ASYS_ProjectRelationship |
|---|---|
| FK2,U1<br>FK3,U1<br>FK1,U1<br>U1 | ProjectID1<br>ProjectID2<br>ProjectRelTypeID<br>Direction |
| | Description<br>EnforceLevel<br>DateCreated |

J

| | ASYS_ProjectRelType |
|---|---|
| PK | ID |
| | Description<br>DefaultEnforceLevel |

| ASYS_ModelUsage | |
|---|---|
| U1 | ProjectModelID |
| U1 | ExtEntityID |
| U1 | PresentationDateTime |
| | PresentationID |
| | Score |
| | OperatorID |
| | ExtAppLocation |

891

U

| ASYS_ModelFeedback | |
|---|---|
| U1 | ProjectModelID |
| U1 | ExtEntityID |
| U1 | PresentationDateTime |
| | Response |
| | ModelLocatorID |
| | PresentationID |
| | PresentationLocatorID |

890

V

| ASYS_ModelInputLookupSQL | |
|---|---|
| | |
| FK1 | ProjectModelID |
| FK2 | SQLProjectID |

METHOD AND SYSTEM FOR THE VISUAL PRESENTATION OF DATA MINING MODELS

This application is a continuation of International Patent Application No. PCT/CA02/01044, filed Jul. 8, 2002, and incorporated herein by reference, and claims the benefit of U.S. Provisional Patent Application No. 60/303,036, filed Jul. 6, 2001, and incorporated herein by reference.

FIELD OF THE INVENTION

The invention relates to the field of data mining systems, and more specifically to a system for the visual presentation of outcomes of data mining models.

BACKGROUND OF THE INVENTION

Digital Ecosystems and Data Creation. A growing number of interactions between individuals and organizations and among organizations (e.g. transactions, exchanges, communications, business processes, and other actions) are conducted through computing systems and across computing networks. The environment within which each organization conducts these interactions with others (e.g. prospects, customers, intermediate product and service suppliers and other intermediaries across the value chain between the ultimate producer of a good or service and its ultimate consumer) can be thought of as its "digital ecosystem".

These interactions are person-to-person (i.e. human aided), person-to-system (i.e. partially automated), and system-to-system (i.e. fully automated). They generate resultant data. As digital ecosystems become more pervasive and interconnected, as the number of intermediaries connected to them grow, and as the numbers and types of interactions being conducted across them expand, many organizations have access to growing volumes of data derived from a variety of different sources.

Need for Improved Analysis and Decisioning Systems. This data is potentially useful to organizations that wish to better manage their business operations. Much of this data is largely unused while being stored in systems that are costly to maintain.

Prior Art Data Mining Systems. In this context, the concept of "data mining" has emerged commercially over the past decade as one means for organizations to analyze data in order to extract useful knowledge therefrom. In general, data mining or knowledge discoveries involves the analysis of data structures for novel or unknown relationships that provide information that can be acted upon.

Current data mining systems are based on the use of knowledge discovery algorithms to automatically analyze data to discover relationships, patterns, knowledge or other useful information. These data mining systems ("DM Systems") currently consist of data mining software tools incorporating data mining algorithms ("DM Tools"), and, more recently, relational database management systems ("RDMS") incorporating data mining algorithms, or enterprise software applications ("DM Applications") containing embedded data mining algorithms.

Referring to FIG. 1, there is shown a block diagram illustrating a typical data mining system 100 in accordance with the prior art. Data created by person-to-person, person-to-system, and system to system interactions is created, exchanged and captured through the Internet, by means of autonomous and interconnected wired and wireless networks, which support a wide range of appliances, applications, and interfaces (e.g. browsers, PCs, PDAs, telephones, etc.) which connect individuals and organizations. This data, which is typically stored in a relational database system ("RDBMS System") 110 or in a data mining application ("DM Application") 120, is extracted by a proprietary data mining system 130 operated by a skilled analyst. The output of the data mining process engaged in by such analyst, in the form of a predictive model or set of scores relevant to the business objective and data structure being analyzed 140 may be returned to the RDBMS System 110 or DM Application 120 through a batch process as static scores. The RDBMS System 110 typically includes proprietary data mining algorithms and supports the application of these algorithms to data stored in the RDBMS System. Data mining models created by the RDBMS System are stored in the RDBMS as tables 112 and applications 111 can access these results if desired via a query or through an application programming interface ("API") with additional query formulation or coding. The DM Application 120 typically includes a data mining engine developed or licensed by the developer of the DM Application. Data mining typically occurs on data stored in the application and resultant data mining models or scores are stored in the application for use in accordance with the internal, proprietary logic of the specific application (e.g. to support automated segmentation in a marketing application).

Current innovations in data mining systems have focused on the nature of data mining algorithms, and the incorporation thereof into the DM System. The focus has been on the process of sourcing data for and creating data mining models, and the development of aids for the user to assess the results of or process of validating a data mining model. For example, in U.S. Pat. No. 6,112,194 (Bigus), discloses a feedback mechanism for monitoring performance of data mining tasks. The feedback mechanism consists of a user selected mining technique type for a data mining operation and an associated quality measure type. A quality indicator, calculated from the mining technique type and the quality measure type, is displayed to the user during the mining operation to help the user decide whether to stop the data mining operation and reconfigure the operation. Other patents related to data mining include U.S. Pat. No. 6,226,648 (Appleman, et al.); U.S. Pat. No. 6,219,775 (Wade, et al.); U.S. Pat. No. 6,216,134 (Heckerman, et al.); U.S. Pat. No. 6,208,989 (Dockter, et al.); U.S. Pat. No. 6,205,472 (Gilmour); U.S. Pat. No. 6,192,356 (Eyles); U.S. Pat. No. 6,108,004 (Medl); U.S. Pat. No. 6,081,788 (Appleman, et al.); U.S. Pat. No. 6,055,510 (Henrick, et al.); U.S. Pat. No. 5,875,285 (Chang); and, U.S. Pat. No. 5,787,425 (Bigus). All of these patents describe various data mining techniques and algorithms and improvements thereto.

DM Tools (e.g. SAS Enterprise Miner™ and ANGOSS KnowledgeSTUDIO™) are software applications installed on a dedicated computer system for use by skilled analysts to perform data mining tasks (i.e. data exploration or knowledge discovery and predictive modeling). These DM tools enable users to import, analyze and model data sourced from a variety of files, database tables, or other data structures. RDBMS Systems (e.g. Microsoft SQL Server 2000™ and Oracle 9i™) incorporate data mining algorithms into the relational database environment, enabling the mining discovery of or relationships between data stored in tables contained in the relational database.

Thus a limitation of these systems is that rather then providing analyst interfaces, they typically provide an application programming interface that enables third parties to design and develop applications and interfaces integrated with these RDBMS Systems. DM Applications provide user interfaces and functionality enabling the application of data mining algorithms to data captured or accessible to the DM Application in a specific business domain. The data mining capabilities of DM Applications may be developed by the application provider (e.g. E.Piphany™, Blue Martini™, etc.), or through integration of the enterprise software application with a data mining engine incorporated into an RDBMS System, or using an integrated data mining engine that provides an application programming interface for this purpose (e.g. ANGOSS KnowledgeSERVER™ and KnowledgeSTUDIO™ SDK).

In summary, the focus of existing DM systems is to support the application of data mining algorithms to data structures to promote the development and validation of a data mining model. These DM systems are written in a proprietary format in a project centric fashion, for use within a proprietary application environment of the DM vendor, for deployment into the organization's production environment as a "score" through a batch process to a mainframe or RDBMS System.

As a result, the traditional approach to data mining has been project oriented and is designed for use by a relatively small group of skilled analysts. Their activities include defining a business objective; sourcing relevant data from different operational data sources for analysis; creating a data mining model based on this analysis; displaying the data mining model in some limited fashion in the form of a report (i.e. a visualization) or the creation of scores (i.e. a numeric representation) placed in a relational database or mainframe computer; and, measuring the validity and usefulness of the data mining model by reference to the defined business objective.

Prior art systems are deficient because of inefficiencies associated with the data mining process and the limited accessibility and usefulness of data mining models once produced. Data mining models are costly to create, requiring skilled personnel to operate and expensive systems to maintain, monitor and optimize; and, difficult to integrate with the systems and applications comprising the organization's digital ecosystem where access to such data mining models might be usefully deployed. Even when a data mining model (e.g. a customer profitability model, a transaction fraud model, or a next product suggestion model) has been created, it has proven to be extremely difficult to integrate the data mining model with other systems in the enterprise, where this knowledge might be more usefully applied, such as other applications, or applications operating in geographically remote locations or on differenting computing platforms.

Accordingly, it is difficult to create and move these data mining models (i.e. scores, rules, and rules systems) to heterogeneous operational environments or to a variety of different applications and business processes at the enterprise level. Similarly, even where a data mining score, rule, or rules system is moved to a production environment, it is difficult to fully implement data mining models which rely on a variety of different data inputs from disparate data sources or to assess the performance of the data mining score, rule, or rules system with existing systems in the operational environment. Furthermore, it is difficult to integrate the results of a multitude of data mining models with other operational systems used to guide decision making. For example, it is difficult to integrate the results of a profitability model with credit limit approvals, new product offers or other similar business strategies and business processes relating to customers based on their profitability.

A need therefore exists for the effective deployment, management and optimization of a multitude of data mining models in a plurality of computing environments, and for the association of these data mining models with business strategies and business processes. Consequently, it is an object of the present invention to obviate or mitigate at least some of the above mentioned disadvantages.

SUMMARY OF THE INVENTION

The invention seeks to provide a solution to the problem of creation, storage and management of numerous data mining models, including the creation of templates for common data mining projects, interfaces for the building and deployment of data mining models, interfaces for managing a multitude of data mining models in heterogeneous computing environments, interfaces for the association of data mining models in both static and dynamic modes with presentations, and the continuous evaluation and optimization of these models and presentations in a plurality of computing environments.

In accordance with this invention there is provided, a method for delivering presentations associated with data mining models comprising the steps of: a) storing the data mining models and the presentations in a repository in a data mining system; b) associating ones of the data mining models with ones of the presentations through references within ones of the presentations; c) receiving a request from a user for a presentation; d) processing the request to determine an appropriate presentation corresponding to the request; and, e) delivering the appropriate presentation to the user.

In one instance the request includes a customer identification or an event identification. In another aspect of the method includes the steps of creating a database schema for the repository; creating data mining models and importing these into the data mining system; and, creating presentations and importing these into the data mining system.

The method includes the additional steps of receiving inputs from users and from reporting systems included in the data mining system; updating the data mining models and presentations based on these inputs to produce updated data mining models and updated presentations; and, storing these updated data mining models, and updated presentations in the repository. The method comprises the additional steps of defining rules under which the data mining models are associated with presentations; and, defining rules under which the presentations are selected and prepared for delivery.

According to another aspect of the invention, a method is provided wherein the data mining models created can include simple and complex scores, static and dynamic scores, rules, rules sets, and rules systems, and composites and combinations of such scores, rules, rules sets, and rules systems. According to another aspect of the invention, a method is provided wherein the presentations include defined sets of content including data mining model references, scores, rules, attributes, activity suggestions, to do lists, pop-up windows, HTML segments, XML scripts, and sets of computer instructions. According to another aspect of the invention, a method is provided wherein the presentations include simple presentations, range based presentations, and complex presentations.

According to another aspect of the invention, a method is provided wherein the method steps are accomplished over networks including the Internet and networks based on Internet technologies. According to another aspect of the invention, a method is provided wherein users include data mining management consoles integrated with or connected over networks that facilitate all aspects of the data mining process from data access, through preparation and data mining model creation to model deployment to disparate business user environments. According to another aspect of the invention, a method is provided wherein users include applications running on a computer, system, or other appliance integrated with or connected over networks. According to another aspect of the invention, a method is provided wherein users include thin or thick clients in a client-server or browser-server environment integrated with or connected over networks. According to another aspect of the invention, a method is provided wherein the reporting systems within the data mining system include outcome monitoring systems and presentation usage monitoring systems.

According to another aspect of the invention, a method is provided wherein second inputs include updates, edits, modifications, deletions, replacements, suspensions, changes, improvements, and optimizations of the data mining models and presentations. According to another aspect of the invention, a method is provided wherein the step of creating presentations and data mining models is accomplished by a text editor, scripting tool, web development tool, or HTML editor. According to another aspect of the invention, a method is provided wherein the step of updating data mining models and presentations includes editing, modifying, deleting, replacing, suspending, changing, improving, and optimizing the data mining models and presentations.

According to another aspect of the invention, a data mining system for delivering presentations associated with data mining models is provided. This system includes a repository for storing data mining models and presentations; means for accessing, creating, updating, and importing data mining models, presentations, and the content and structure of the repository; means for selecting and preparing presentations for delivery to users; and, means for accessing the data mining system by users, for receiving first and second inputs from users, and for delivering presentations to users.

According to another aspect of the invention, a system is provided wherein data mining models include simple and complex scores, static and dynamic scores, rules, rules sets, and rules systems, and composites and combinations of such scores, rules, rules sets, and rules systems. According to another aspect of the invention, a system is provided wherein presentations include defined sets of content including data mining model references, scores, rules, attributes, activity suggestions, to do lists, pop-up windows, HTML segments, XML scripts, and sets of computer instructions. According to another aspect of the invention, a system is provided wherein presentations include simple presentations, range based presentations, and complex presentations.

According to another aspect of the invention, a system is provided wherein the repository is a database having a database schema and database management system. According to another aspect of the invention, a system is provided wherein the means for accessing, creating, updating, and importing data mining models, presentations, and the content and structure of the repository includes a data mining console system which incorporates all interfaces and related functionality required to configure the system by reference to a plurality of data sources, support the import and preparation of data extracted from these sources through templates and tools created for numerous industry, business, user and data types, and supports the manual or automated creation of data mining models by applying a plurality of data mining algorithms to these data sources.

According to another aspect of the invention, a system is provided wherein the means for selecting and preparing presentations for delivery to users includes an analytic decision engine system including model presentation services and scoring services modules. According to another aspect of the invention, a system is provided wherein the means for accessing the data mining system by users, for receiving first and second inputs from users, and for delivering presentations to users includes networks including the Internet.

According to another aspect of the invention, a system is provided wherein users include data mining management consoles integrated with or connected over networks. According to another aspect of the invention, a system is provided wherein users include applications running on a computer, system, or other appliance integrated with or connected over networks. According to another aspect of the invention, a system is provided wherein users include thin or thick clients in a client-server or browser-server environment integrated with or connected over networks.

According to another aspect of the invention, a system is provided wherein first inputs include attributes provided by or associated with users including identity and locator. According to another aspect of the invention, a system is provided wherein second inputs include updates, edits, modifications, deletions, replacements, suspensions, changes, improvements, and optimizations of data mining models and presentations. According to another aspect of the invention, a system is provided that includes reporting systems. According to another aspect of the invention, a system is provided wherein the reporting systems include outcome monitoring systems and presentation usage monitoring systems. According to another aspect of the invention, a system is provided wherein the reporting systems are operable to produce second inputs.

According to another aspect of the invention, a system is provided that has stored therein data representing sequences of instructions which when executed cause the above-described method to be performed. The system generally has servers, memory devices, processing units, input devices, output devices, display devices, and users for storing and processing sequences of instructions and for enabling communications with users.

BRIEF DESCRIPTION OF THE DRAWINGS

The invention may best be understood by referring to the following description and accompanying drawings which illustrate the invention. In the drawings.

DETAILED DESCRIPTION OF THE PREFERRED EMBODIMENTS

Figure 1:
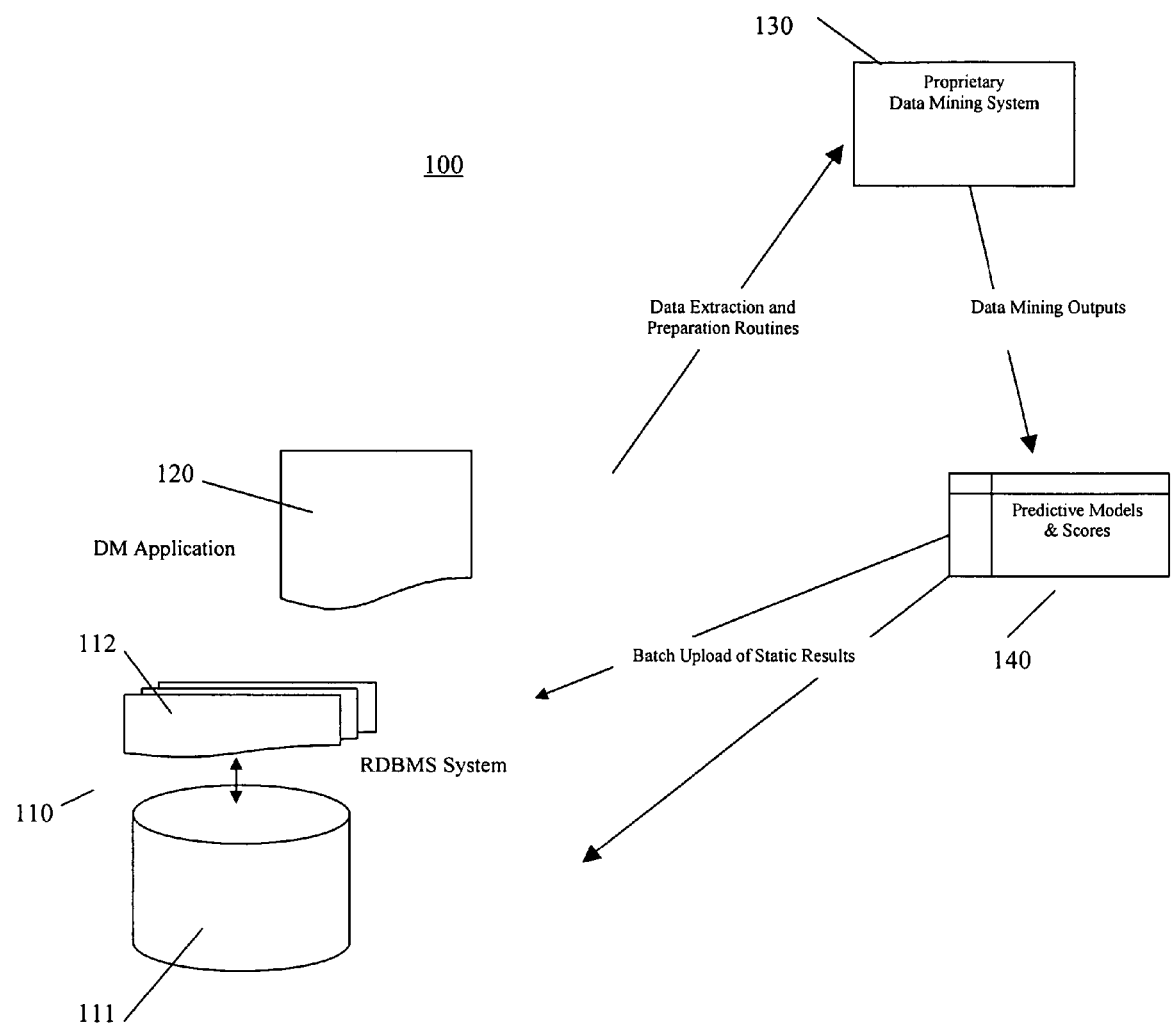
FIG. 1 is a block diagram illustrating a typical data mining system in accordance with the prior art.

In the following description, numerous specific details are set forth to provide a thorough understanding of the invention. However, it is understood that the invention may be practiced without these specific details. In other instances, well-known software, structures and techniques have not been described or shown in detail in order not to obscure the invention. In addition, the system and method may be implemented using a number of different programming languages (e.g. Java™ and Enterprise Java Beans™) and for a variety of different platforms (e.g. UNIX™ and Linux™). The following description illustrates the invention by reference to the Microsoft™ platform comprising the Windows™ operating system, SQL Server™ relational database server, and Internet Information Services™ web server, but other platforms, database server, web servers, applications and programming tools may also be used. In the drawings, like numerals refer to like structures or processes.

The term "data mining system" ("DM system") is used herein to refer to any machine for processing data including transmitting or receiving data, and including the computer systems, devices, and network arrangements described herein. The term "data mining algorithm", also referred to as "knowledge discovery" algorithm, is used herein to refer to algorithms including, for example, logistic regression, linear regression, neural networks, Bayesian networks, decision trees, association rules, cluster algorithms (e.g. K-Means or Expectation Maximizing), that may be incorporated into DM systems.

The term "data mining model" ("DM model") is used herein to refer to a predictive model developed using one or more data mining algorithms. A data mining model may consist of a single score or set of scores, a single rule or set of rules, as well as composites and combinations of such scores and rules, comprising a complex rules system.

The term "score" is used herein to refer to a probability of an event. For example, a score of 0.1 may reflect a 10% probability that a given customer will default on a loan).

The term "complex rules system" is used herein to refer to a list of potential outcomes and associated probabilities (e.g. a complex rules system for a "next purchase" transaction may predict the likelihood of several different outcomes based on a variety of different data inputs, including past actions, transactions, interactions, geodemographic data and other relevant data about both the transactor and other persons, with a confidence measure associated with each different possible outcome).

The term "data mining provider" is used herein to refer to an application server (e.g. ANGOSS KnowledgeSERVER™, Microsoft™ SQL Server Analysis Services™, or an implementation of an application server under JSR 073, a Java™ Community standard) that may train data mining models (i.e. based on the analysis of data) and call existing data mining models to generate scores (i.e. based on a new data instance).

The term "static model" refers to a data mining model that calculates a score (for example, by looking up a pre-computed score stored in a table as a result of a batch process).

The term "dynamic model" is used herein to refer to a data mining model that calculates a score on a real-time basis. The score may be calculated using model inputs that are provided in the context of the person to person, person to system, or system to system interaction or looked up from a required data source while an interaction occurring within a digital ecosystem is in process.

The term "presentation" is used herein to refer to a defined set of content (e.g. a promotion, suggestion, script, document, a digitally reproduced image capable of being rendered in a computer interface, or a set of instructions capable of being processed by a computer system) together with a collection of data mining model references, attribute references, rules, and formulas that may define how to select and prioritize that presentation and all other possible presentations based on an examination of any number of different simple or complex rules systems and attributes to determine the relevant reference score and attribute values for a particular person or entity. The presentation is the outcome or result of this automated decision process. The presentation may be represented by an HTML segment that is displayed through a computer interface or it may be represented by a set of instructions communicated to one or more computer systems.

In general, the present invention provides a method and system for the creation, storage and management of data mining models (i.e. scores, rules and complex rules systems), including the development and deployment of data mining models, the association of data mining models in both static and dynamic modes with presentations, and the continuous evaluation and optimization of these models and presentations for a plurality of computing environments. For example, using the invention described herein a data mining model may compute that a particular customer is both highly profitable and highly likely to defect. The present invention enables both the computation of these propensities, in either a systemic fashion through the use of predefined configuration tools and templates to create such computation, or at the time of a person to person or person to system interaction involving that customer, and the serving of appropriate, defined presentations which take into account these propensities and related business rules that have been established to address "high profitability", "high risk" and "high profitability and high risk" customers (e.g. a directed offer to approve a waiver or reduction of interest rates or service charges) as an HTML segment where this HTML segment may provide for the display of the presentation and other possible presentations (i.e. including the suppression of all presentations), in priority order, as an HTML document. Alternatively, the presentation may comprise the execution of an automated process or the delivery of content to some other person or location to initiate an action or course of action. For example, a background process may monitor a web based customer filing process for new insurance claims and pass these claims through one or more data mining models (such as one or more of a loyalty (defection) model, a fraud model, and a profitability model). If the presentation computed is "INVESTIGATE", for example, the process would route the claim to an investigator.

The invention, may be deployed within enterprise software applications, including, for example, the Siebel Systems, Inc.'s ("Siebel™") suite of "eBusiness Applications" ("eBusiness™"). The Siebel eBusiness™ application suite is a leading "customer relationship management" ("CRM")

software application and is representative of standard CRM environments. The invention supports the creation of data mining models using tools and interfaces designed specifically by reference to the Siebel™ data schema, and the deployment of data mining models and associated presentations to Siebel eBusiness™ applications in several modes including applets working within the interface environment and "pop up" windows working within the Siebel eBusiness™ environment. Through integration with the Siebel eBusiness™ application infrastructure, the invention's analytic decision engine treats all Siebel eBusiness™ interfaces (e.g. Siebel™ "eSales™", "eService™", "eCallCenter™", "ePersonalization™", and "ePricer™") as target environments for the delivery of presentations based on the deployment of data mining models. Integration options may include using Siebel™ applets working within the Siebel™ interfaces themselves, or with browser based messaging from the invention's analytic decision engine to the target environment, or using the system itself as an integrated application within the Siebel eBusiness™ environment.

With the inventions when a data mining model is created, it may be integrated with an enterprise's systems where the knowledge provided by the model may be usefully applied through the delivery of appropriate content, suggestions, presentations or other presentations at the point of interaction (e.g. through the delivery of a notice about a special promotion for profitable customers to be given to a profitable customer visiting a web site, through the automated flagging and investigation of a transaction identified as suspicious immediately upon the reporting of the transaction, or through the timely delivery to a sales representative of a product or service sales suggestion for one of their client's based on the recent transaction history of that client).

Figure 2:
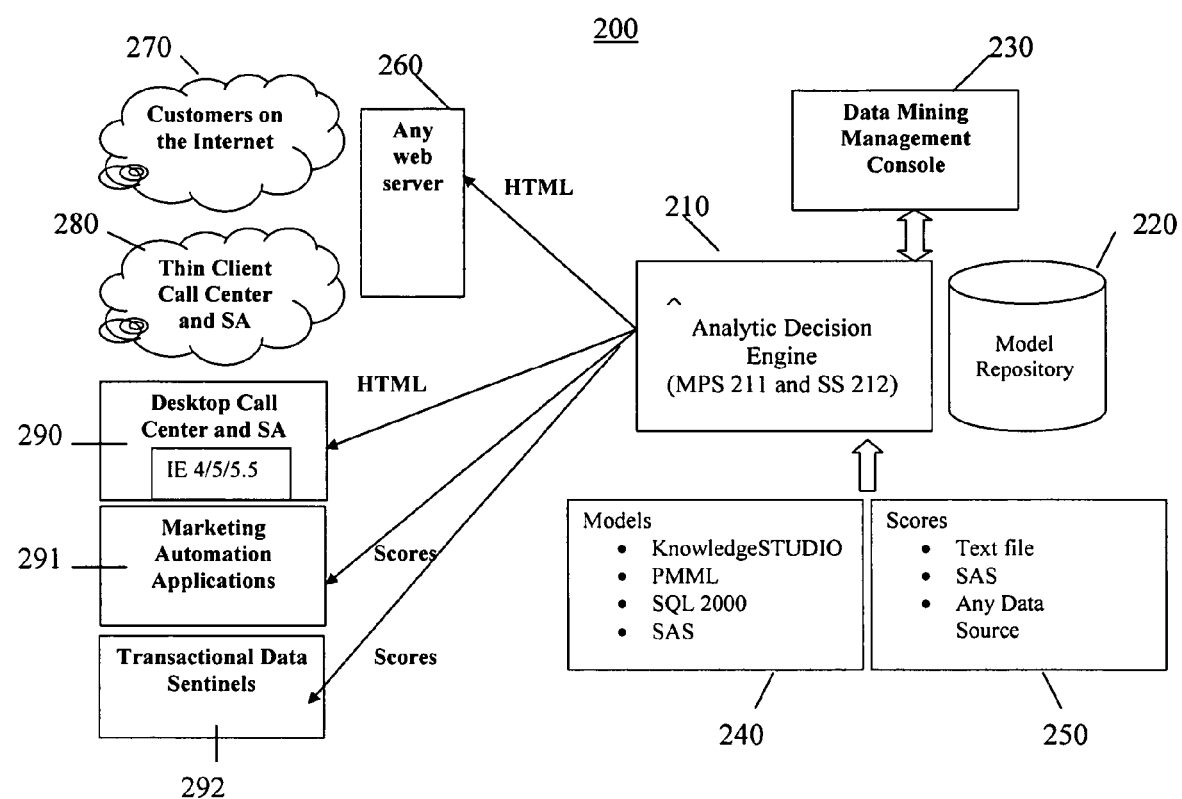
FIG. 2 is a block diagram illustrating a data mining system in accordance with an embodiment of the invention.

Data Mining System Functional Components. Referring to FIG. 2, there is shown a block diagram of a data mining system 200 in accordance with an embodiment of the invention. The data mining system 200 includes the following: an analytic decision engine ("ADE") 210; a model repository 220 for the storage of scores, rules, and rules sets resultant from multiple data mining tasks; a data mining management console 230; and, means for importing into the repository 220 a wide variety of data mining models 240 and scores 250 generated from data mining processes involving diverse DM Tools (e.g. SAS Enterprise Miner™, IBM Intelligent Miner™, ANGOSS KnowledgeSTUDIO™), RDBMS Systems (e.g. Microsoft SQL Server 2000™), and DM Applications.

In addition, the data mining system 200 may include the following: a web or application server 260 that can serve as a target environment for the deployment of data mining models and presentations; customers 270 interacting in the digital ecosystem of an organization through the Internet who may be identified and targeted for the delivery of data mining models and associated presentations; representative thin client enterprise applications 280 regulating person-to-person, person-to-system, and system-to-system interactions (e.g. call center and sales force automation applications) which may be present in the digital ecosystem of an organization and which serve as presentation environments for the analytic decision engine 210; representative client-server types of enterprise applications 290 regulating person-to-person, person-to-system and system-to-system interactions (e.g. "thick" client or "desk top" call center and sales force automation applications) which may be present in the digital ecosystem of an organization and which serve as presentation environments for the analytic decision engine 210; representative enterprise productivity applications 291 (e.g. marketing and campaign management applications), in either client-server or "thin client" forms, which may be present in the digital ecosystem of an organization and which serve as presentation environments for the analytic decision engine 210; and, automated business process applications 292 (e.g. automated transaction and reporting systems such as claims systems) in either client-server or "thin client" forms, which may be present in the digital ecosystem of an organization and which serve as presentation environments for the analytic decision engine 210.

The analytic decision engine 210 supports the import of models 240 and scores 250 for use in the analytic decision on a platform and data mining tool agnostic basis and may support a wide variety of DM Tools, RDBM Systems, and DM Applications.

In general, the analytic decision engine 210 includes means designed to accelerate the data mining process and provide a flexible, extensible, and highly scalable environment for deploying and managing a number of different data mining models and associated presentations. It may support, for example, the following: (a) the importing of data mining models 240 and scores 250 together with conversion utilities for converting proprietary data mining models (e.g. SAS™ models) into XML documents to support applications of the analytic decision engine 210 on a vendor, platform, and system neutral basis; (b) a model repository 220 for the storage of these data mining models 240, as well as for optimization of these models and supporting other features of the system; (c) a data mining management console 230 which provides means to enable a human user to manage, evaluate, and optimize a plurality of data mining models 240 operating in one or more digital ecosystems; and, (d) an application server 260 which supports the deployment of data mining models to users and interfaces connected to the application server directly by wired or wireless connections 290, 291, 292 or through an application, interface, or appliance connected to the network by wired or wireless connections 270, 280.

In more detail, the data mining system 200 and analytic decision engine 210 allow for the storage of data mining models, consisting of simple and complex rules systems, rules, rules sets and rules systems, as well as composites and combinations of such scores, rules, rules sets and rules systems (all of the foregoing being data mining models), through computer-based graphical user interfaces, network connections, and means for:

a) Directly creating data mining models for storage in, or importing data mining models developed using a variety of data mining tools into, a common repository (i.e. the model repository 220), in a file format or database schema, and accessible concurrently to one or more computers in a local area network, wide area network, or Internet network 260, 270, 280, 290, 291, 292;

b) Populating the model repository 220;

c) Exposing the schema to permit two way access via the network by human users or executable programming code in the form of software applications or interfaces running on computers, systems, and other appliances integrated with or connected over the network 260, 270, 280, 290, 291, 292 to the model repository 220;

d) Managing applications across the network 260, 270, 280, 290, 291, 292 with the model repository 220 for model creation, interrogating the model repository 220, and returning processing results;

e) Optimizing the continuous accessing, testing and modification of the data mining models 240, 250 contained in the model repository 220 as a result of user inputs to, and or computer managed interactions captured by, applications 260, 270, 280, 290, 291, 292; and, f) Providing user interfaces for the above.

Figure 3:
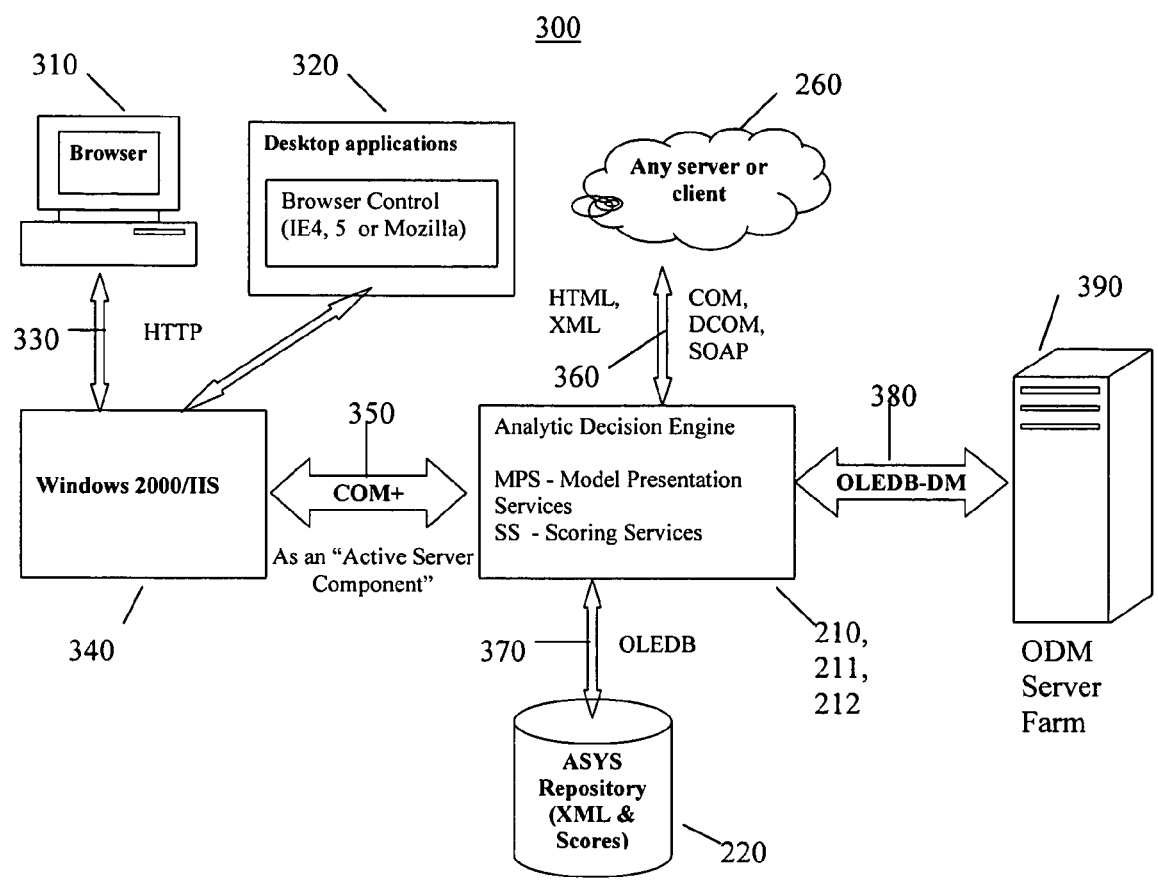
FIG. 3 is a block diagram illustrating typical interfaces for the data mining system in accordance with an embodiment of the invention.

Scoring Services and Presentation Services. Referring to FIG. 3, there is shown a block diagram illustrating typical interfaces 300 for the data mining system 200 in accordance with an embodiment of the invention. The primary modules within the ADE 210 include presentation services 211 and scoring services 212. The ADE 210, presentation services 211, and scoring services 212 integrate with the typical interfaces 300 which may include the following: a browser 310, desktop applications 320, both of which may communicate with Windows 2000/IIS™ (internet information server) 340 via HTTP 330; COM+(component object model extension) 350 links between Windows 2000/IIS™ 340 and the analytic decision engine 210; OLEDB-DM (application program interface) links between the analytic decision engine 210 and OLEDB-DM servers 390; and, HTML, XML, COM (component object model), DCOM (distributed component object model), or SOAP (simple object access protocol) 360 links between the analytic decision engine 210 and other servers and clients 260.

Figure 8:
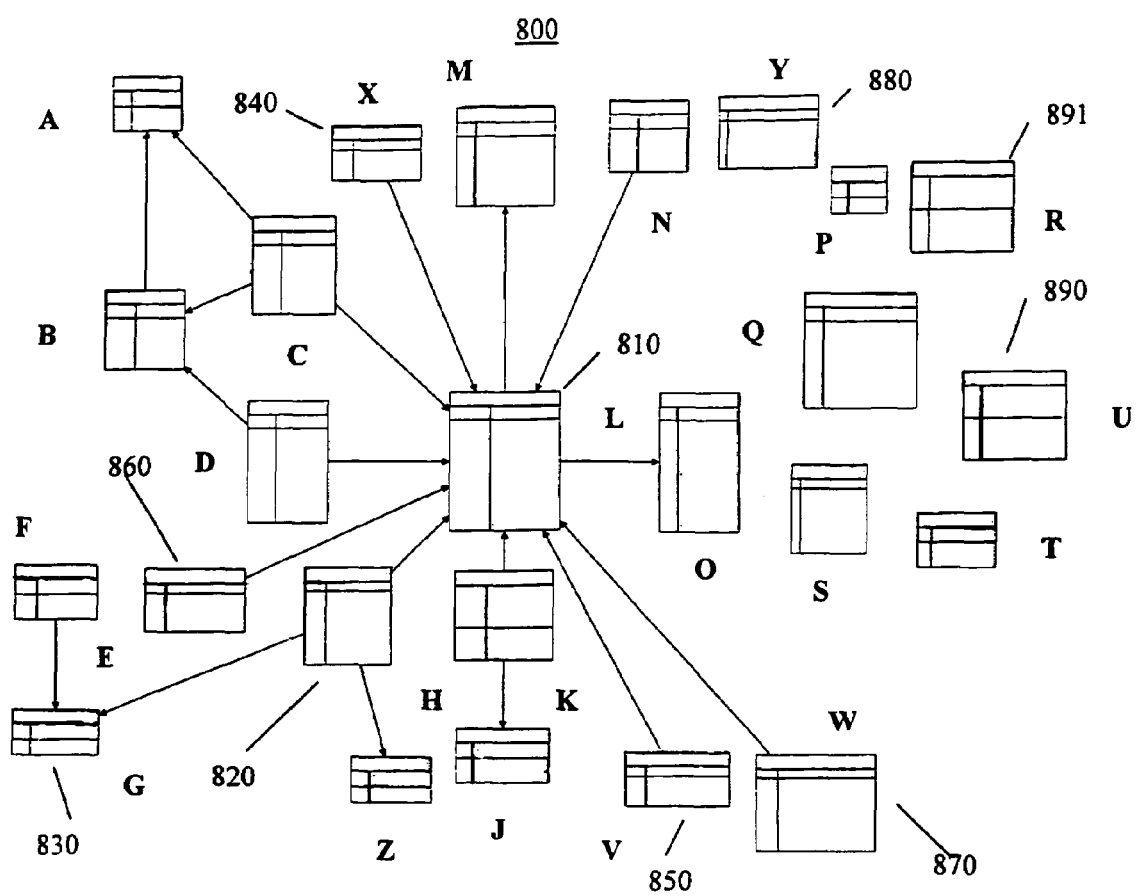
FIG. 8 is a block diagram illustrating a database schema for the model repository in accordance with an embodiment of the invention; and, FIG. 9 is a block diagram illustrating exemplary reporting modules for the analytic decision engine in accordance with an embodiment of the invention.

Referring to FIG. 8, there is shown a block diagram of a database schema 800 for the model repository 220 in accordance with an embodiment of the invention. The database schema 800 is referred to as the "ASYS" database in the following. Referring to FIGS. 2, 3, and 8, the analytic decision engine 210 integrates with an organization's information technology environment via the presentation services ("MPS") 211 and scoring services ("SS") 212 modules.

The MPS module 211 includes the following functionality:

Generation of HTML to display in a presentation environment of a client-server or browser server based application such as on a web site or to a customer service representative (i.e. in the manner which will be described below with reference to FIGS. 4 through 7).

Monitoring the use of data mining models by providing an audit file (i.e. as part of the repository 220 a representative schema of which is illustrated in FIG. 8) which records relevant data with respect to the use of simple and complex models with related means to define parameters for such recording actions (e.g. frequency) by reference to specific models and other measures. This functionality enables a user to manage a wide range of simple and complex models operating in a variety of different systems and to assess the performance of these models.

The incorporation of appropriate content into the HTML being presented that, in conjunction with server modules, records the outcome of the running of the models and presentations in the repository 220, as illustrated in FIG. 8, for use in training new models, in optimizing existing models, and in modifying or replacing presentations associated with existing models.

The MPS may also return the presentation ID list as opposed to the HTML which conveys those presentations. This capability allows for additional features described below.

The ability to benchmark performance of MPS 211 and SS 212 by applying a long list of customers in sequence to a presentation definition. This may be accomplished by running a data batch processing routine that performs the same operations done in a real time mode. Performance statistics may be gathered and analyzed by running the presentation definition in this batch mode to estimate performance and hardware requirements for a real time system.

The ability to generate overview reports that show the overall distribution of the presentations. A presentation editor may allow users to create a complex series of rules and formulas that determine which presentation to give to a particular individual. As such, it is easy to loose site of the over all effect of these. By applying the presentations to a complete list or statistically representative sample of customers and tabulating the resultant presentations, a user may gain an overall view of the presentations.

The ability to export a list of presentations that may be imported by a marketing automation application. This allows an organization to have a unified presentation strategy across all marketing channels.

In order to achieve high scalability, an instantiated MPS object may be heap-lock free (i.e. runtime read only), multithreaded, and initialization stateless. Instantiating and initializing an MPS object is time consuming. It may digest all the presentation rules and formulae, pre-compile any SQL data acquisition or scoring commands, and load the presentation HTML into memory. As such, it should not be initialized during each score request. Instead, the object should be instantiated once when it is first used or at another appropriate time. This means that the object may exist on the server for an extended period of time (e.g. stored in the Windows™ Running Object Table or ASP™ Application object) and many different users (i.e. execution threads) may be simultaneously using the MPS object. In order for this not to cause performance bottlenecks, the MPS object should not require many (any) mutex locks required when writing to heap memory.

Because MPS is designed for operational environments and live objects may be retained in memory, updates to presentation definitions may implement special handling. In order to handle this situation, presentation objects have a version number (refer to the "ASYS_Projects" table 810 contained in FIG. 8) and the moniker (name) of the object has the ID and version number. When a new version of the object is saved, the version number is incremented. The next time the presentation object is requested the new most up-to-date one will be instantiated and initialized. If any old objects are still in use, they will run as normal.

When a calling module (e.g. client browser or another server) calls MPS to request the results of a presentation, a "Model Locator" may be used to refer to the presentation. This locator in turn links to one or more presentations. This allows a presentation to be changed without having to modify any clients. For example, all clients could use the URL query string "PresentationLocator=StdCC&EntityID=12345". In this case, "StdCC" is the ID of the locator. This locator ID is looked up to discover the actual presentation. In order to have clean and unbiased data on the benefits of one presentation versus another, the locator ID may actually link to more than one presentation. One of the presentations may be a test group. Some exposures will be given to the test presentation on a random or pre-selected customer list basis. This allows for valid comparisons between two or more presentations.

The client may also pass data to the ADE 210 for use by dynamic models. The query string "PresentationLocator=StdCC&EntityID=12355&Age=25&Sex=M" is an example of this. In this example, if any of the dynamic models require inputs "Age" or "Sex" then the passed values will be used, even if a data lookup can also fulfill the data request. Furthermore, the query string, "PresentationLocator=StdCC&Age=25&Sex=M" does not include an entity ID. In this case, all the required data must be provided and all the models must be dynamic. This feature allows for "anonymous CRM" (i.e. client relationship management).

The SS module 211 includes the following functionality:

The ability to deal with any number of different data mining scoring engines and model types. This is accomplished by a portability layer which will be referred to as the real time scorer ("RTS"). RTS may be initialized with a list of model ID's. Each model may be associated with a particular data mining provider (refer to the "ASYS_MODEL" and "ASYS_MODEL_SOURCE" tables 820, 830 contained in FIG. 8). RTS may in turn call the actual Data mining providers to calculate the scores.

To optimize performance, SS may have similar characteristics to the MPS module in that an SS object may be thread safe, initialize stateless, and read only to heap memory.

The SS may expose an identical interface for both static models and dynamic models. This allows dynamic and static models to be easily interchanged.

A series of data fulfillment routines may be associated with a dynamic model (refer to the "ASYS_ModelInput-Lookup" table 870 in FIG. 8). The SS may be initialized with 1 or more models and their associated data fulfillment data. The data fulfillment requirements may be optimized taking into account similarities between models. For example, if four models require an "Age" variable, it need only be looked up once.

A common data acquisition interface may be used to fulfill model data requirements. An example of such an interface is as follows:

```
interface IGenericLookup : IDispatch
{
    [id(1), helpstring("method Initialize")] HRESULT Initialize([in]
long lProjModelID, [out, retval] VARIANT_BOOL *ret);
    [id(2), helpstring("method Prepare")] HRESULT Prepare([in]
BSTR sConnStr, [in] BSTR sUserID, [in] BSTR sPassword, [out, retval]
VARIANT_BOOL *ret);
    [id(3), helpstring("method GetData")] HRESULT GetData([in]
BSTR sEntityID, [out, retval] VARIANT *ret);
    [id(4), helpstring("method GetCommandText")] HRESULT
GetCommandText([out, retval] VARIANT *ret);
};
```

A prepare method allows any time-expensive operations (e.g. compiling SQL or integrating data files for lookup information) to be done during an initialization phase.

By using such an interface, new data lookup techniques may be added.

Three exemplary interfaces are as follows:

1. Data Lookups
   a) The connection string, table, field name (or expression), ID and further WHERE clause info are stored in the definition (refer to the "ASYS_ModelInput-Lookup" table 840 in FIG. 8).
   b) A SQL statement is generated from this information.
   c) The effect of different connection strings is "joining" information from a variety of different sources.
   d) If more than one model requires the same information it is consolidated.
2. SQL
   a) Users may also enter a SQL statement to calculate any data requirements (refer to the "ASYS_ModelInputSQL" table 850 in FIG. 8)
3. Stored Procedures
   a) This allows a database stored procedure to be specified and executed as part of the data fulfillment process (refer to the "ASYS_ModelInputSP" table 860 in FIG. 8)

Figure 4:
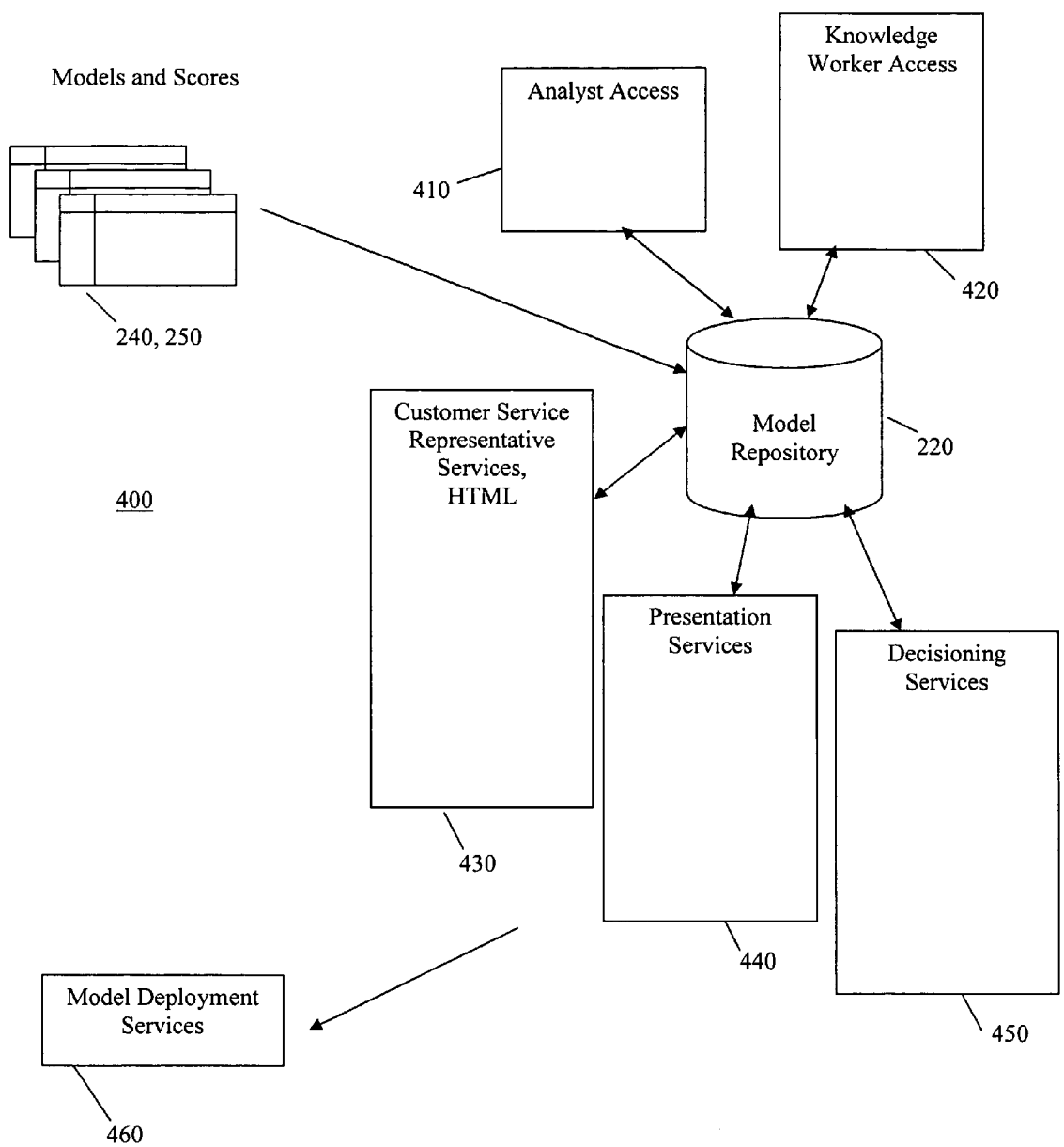
FIG. 4 is a block diagram illustrating exemplary interfaces to the model repository of the data mining system in accordance with an embodiment of the invention.
Figure 5:
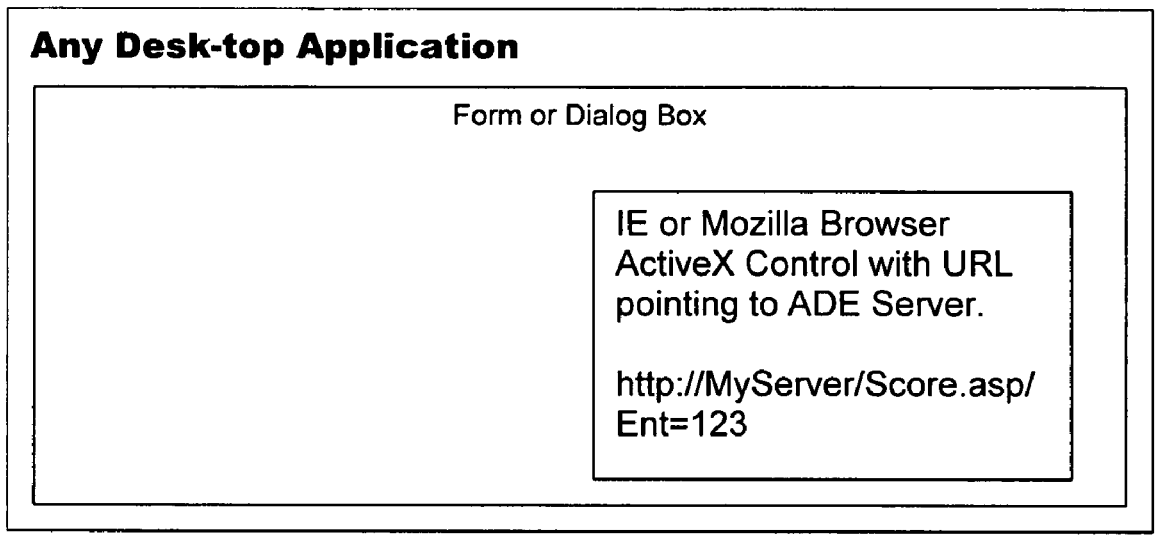
FIG. 5(a) is a block diagram illustrating integration of a traditional client-server or "thick" desktop application with the analytic decision engine in accordance with an embodiment of the invention.
FIG. 5(b) is a block diagram illustrating an interface suggestion applet in accordance with an embodiment of the invention.
FIG. 5(c) is a screen capture of an interface suggestion applet in accordance with an embodiment of the invention.
Figure 5:
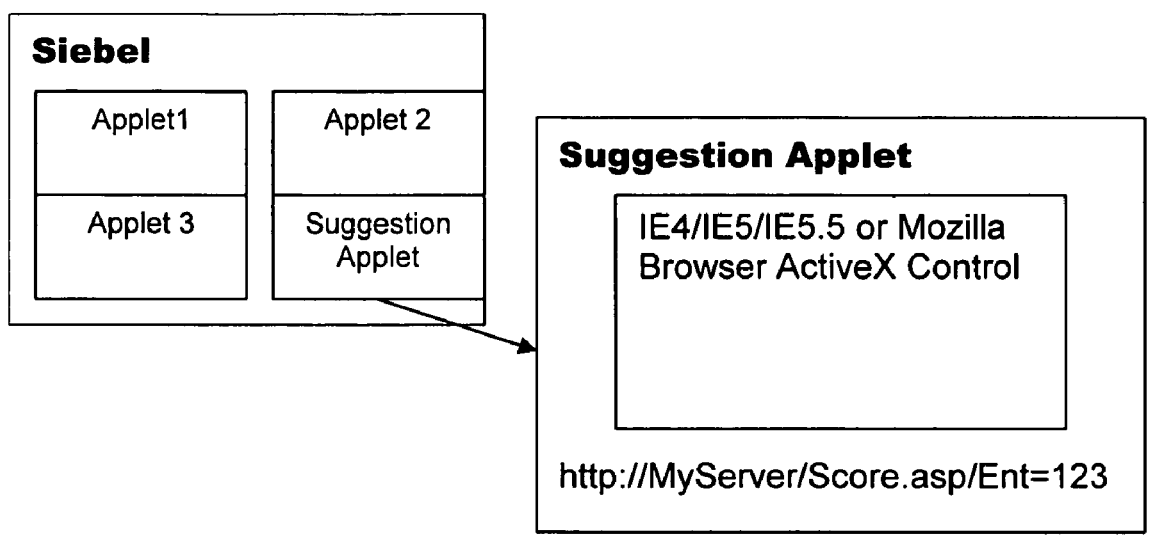
Figure 5:
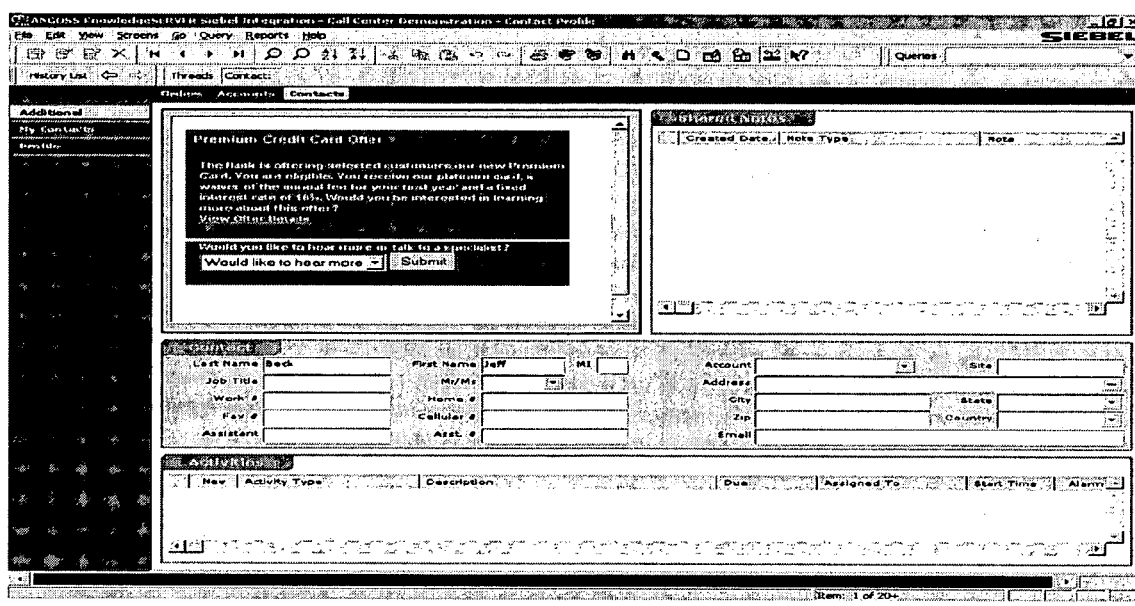
Figure 6:
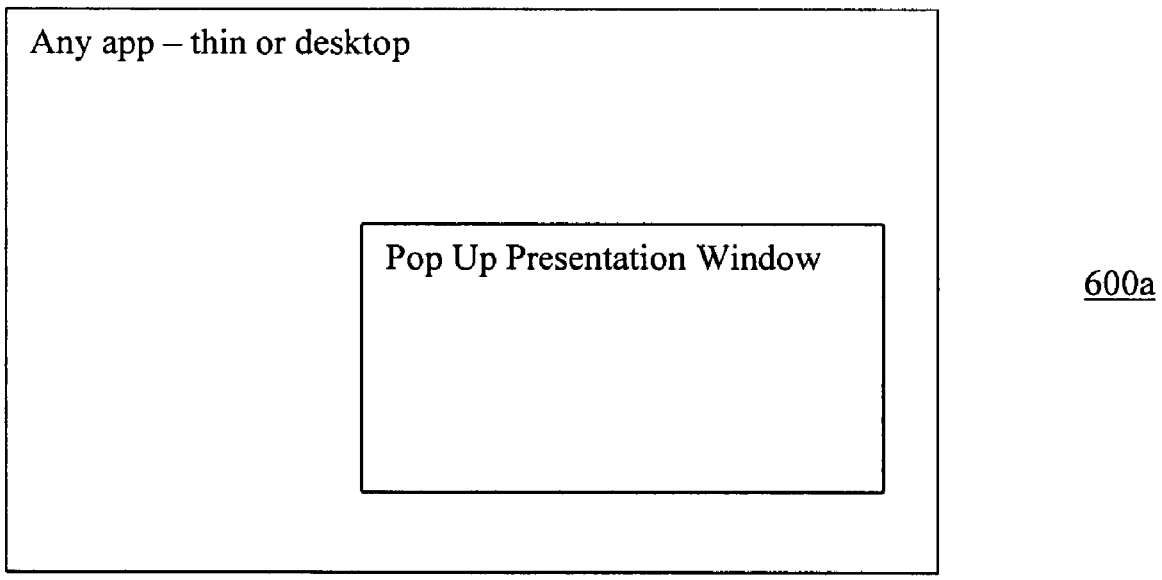
FIG. 6(a) is a block diagram illustrating integration via pop-up window of an application with the data mining system in accordance with an embodiment of the invention.
FIG. 6(b) is a block diagram illustrating integration via pop-up window within the Siebel "Call Center" application in accordance with an embodiment of the invention.
Figure 6:
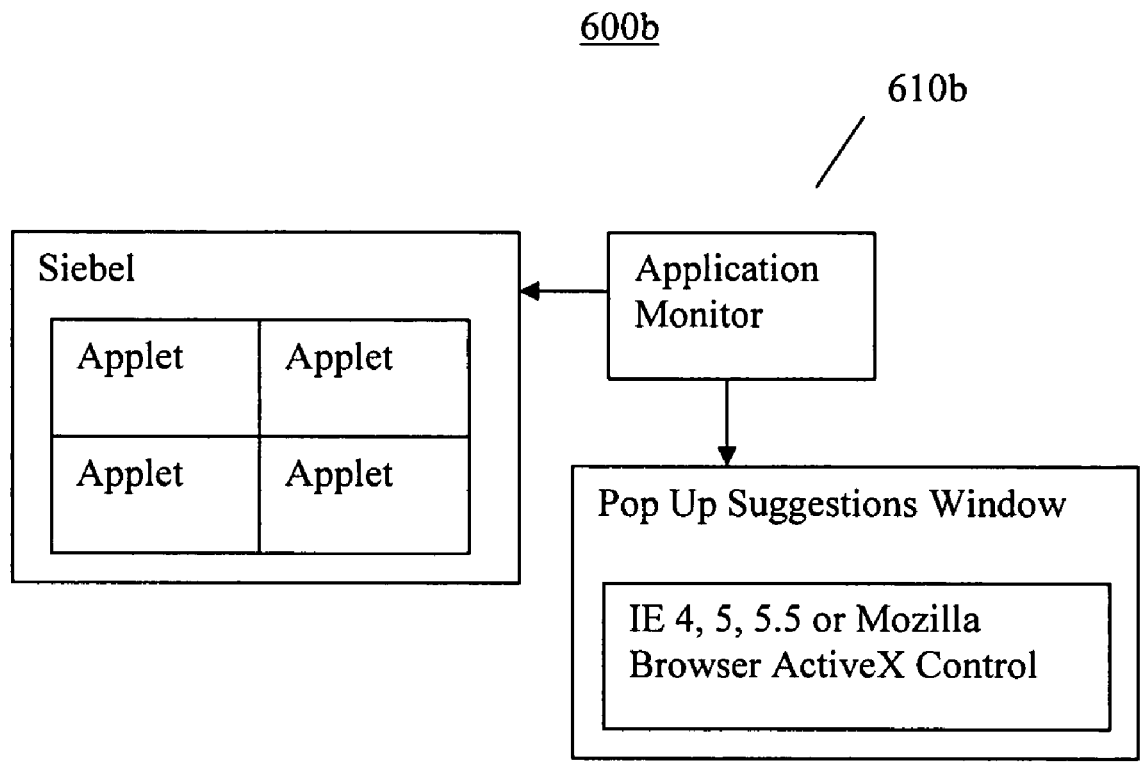
Figure 7:
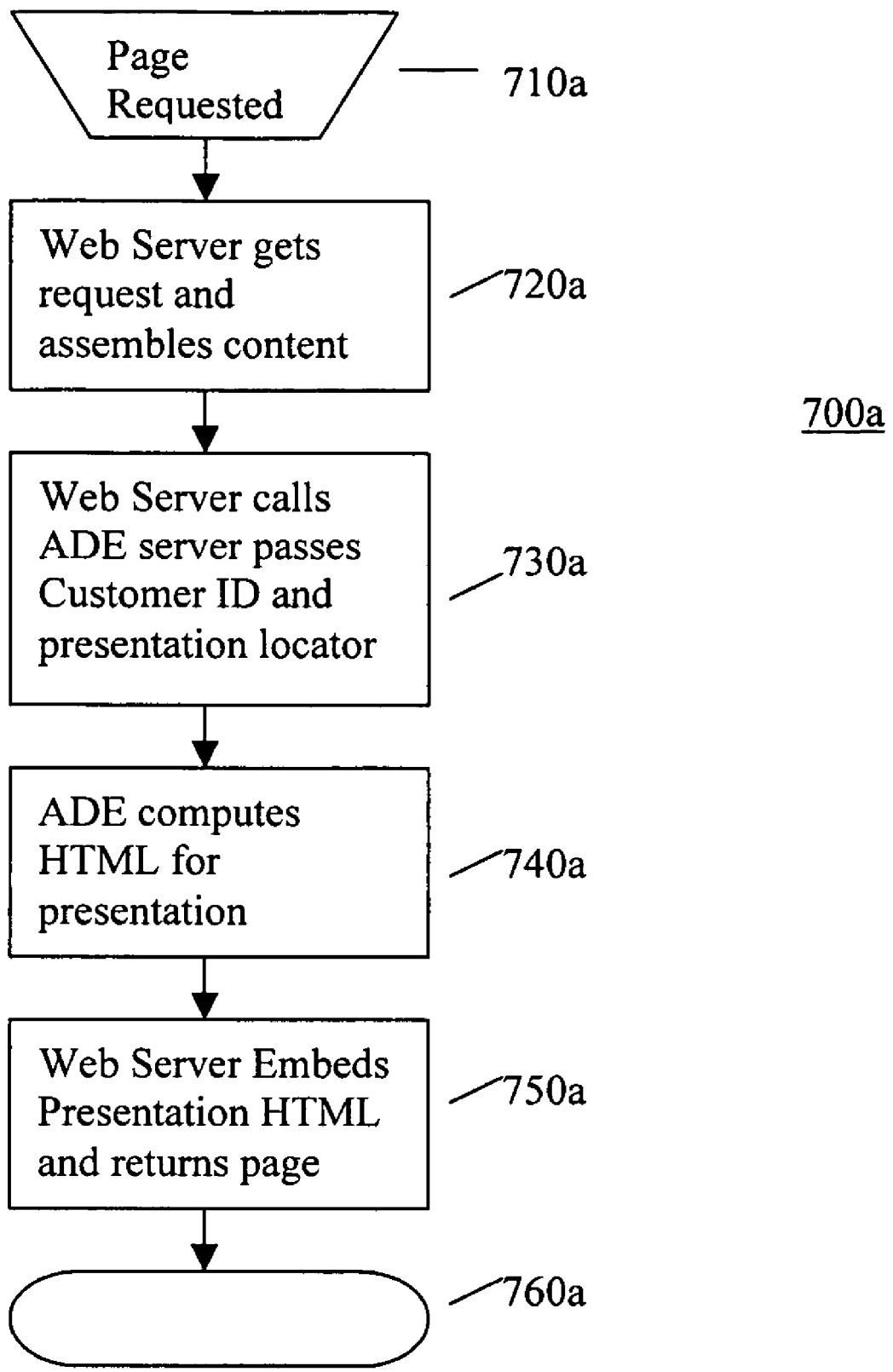
FIG. 7(a) is a flow chart of thin client server integration with a web server in accordance with an embodiment of the invention.
FIG. 7(b) is a block diagram of frame based thin client server integration in accordance with an embodiment of the invention.
Figure 7:
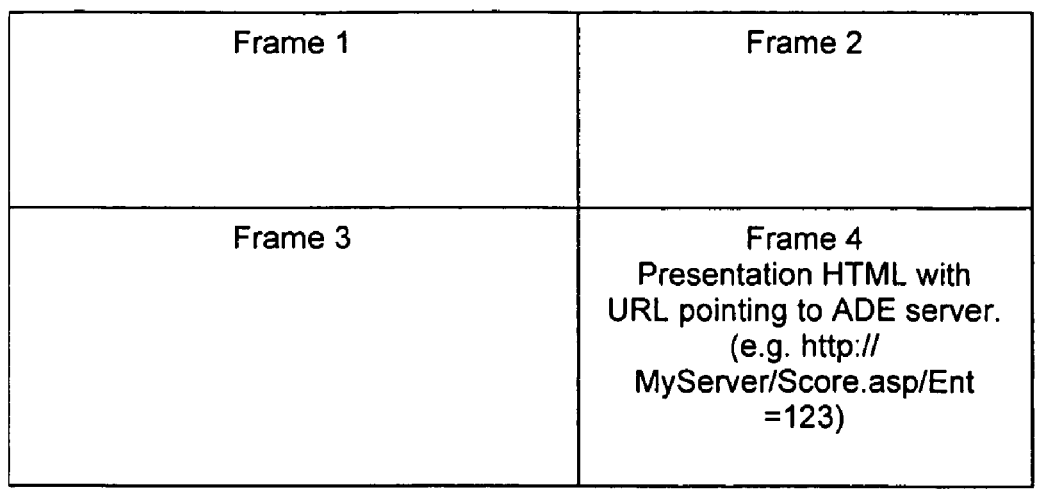

Implementation of the Data Mining System Using the MPS and SS Modules. Referring to FIG. 4, there is shown a block diagram of exemplary interfaces 400 to the model repository 220 of the data mining system 200 in accordance with an embodiment of the invention. The exemplary interfaces 400 include system management interfaces, integration with authoring tools for presentation creation, and illustrative interfaces integrated with the MPS 211 and SS 212 modules. These interfaces 400 include the following:

interfaces 410 and data processing routines enabling the creation, management and optimization of intelligent business rules systems to support customer service requests and business process automation (e.g. credit limit increases, fee and rate adjustment requests, and approval and pricing decisions) through the integration and deployment of data mining models and associated presentations at relevant points of interaction;

interfaces 420 and data processing routines enabling relationship managers, investigators, and knowledge workers to access, via their browser, presentations of relevance to their functional areas of business activity (i.e. their client base and targeted prospects) to support their daily activity and improve their overall productivity;

interfaces 430 and data processing routines enabling the deployment of data mining models in both static and dynamic mode to customer service representative interfaces (e.g. contact management systems and call center systems) and customer self-service interfaces (e.g. the web and Internet or Intranet based kiosks);

interfaces 430 and data processing routines enabling the creation and storage in the Data Mining Repository of HTML documents (such as sales scripts, marketing promotions, forms, and other useful guides and tools) created for association with data mining using industry standard HTML authoring tools scores to support targeted interactions;

presentation services 440;

interfaces 450 and data processing routines enabling the capture, storage and analysis of feedback gathered from interactions triggered by the calling of data mining models and associated presentations from the Data Mining Repository to support optimization of these interactions and the business processes supporting them;

interfaces 450 and data processing routines enabling the monitoring and creation of reports to assess the performance of data mining models and defined presentations in these target environments; and, model deployment services 460.

In general, the exemplary interfaces 400 include the following: means for the importing of data mining models and scores (i.e. derived from DM Tool RDBMS System or DM Application) 240, 250; a model repository 220; analyst interfaces 410 to manage simple and complex models and scores in the model repository; knowledge worker productivity interfaces 420 to enable the association of simple and complex models and scores, as well as attributes, with presentations using HTML editors; model deployment and optimization interfaces and services 430 to enable the deployment of batch and dynamic models to any appliance, interface, application, database, or system, the tracking and analysis of outcomes, and the optimization of data mining models and scores contained in the model repository based on these outcomes; presentation interfaces and services 440 to enable the deployment of presentations associated with static and dynamic data mining models, the tracking and analysis of outcomes, and the optimization of data mining models and scores contained in the model repository based on these outcomes; decisioning interfaces and services 450 to enable the automation of actions and interactions supporting business processes by automating the application of data mining models to these actions and interactions, the tracking and analysis of outcomes, and the optimization of data mining models and scores contained in the model repository based on these outcomes; and, static and dynamic model deployment in batch and real time modes is enabled to support any action or interaction, across the Internet, through any network, to any appliance, application, or interface 460.

The MPS 211 and SS 212 modules support the efficient integration of data mining models resulting from the analysis of a wide variety of different data sources into a common environment for the management of these models and for the association of a wide range of different presentations linked to the data mining models in an organization's operating environment.

As referred to above, a "presentation" may consist of a targeted message, promotion, or other relevant content which supports a person-to-person, person-to-system, or system-to-system interaction (e.g. a promotion to a customer or prospect which meets the criteria associated with the underlying data mining scores defined for that presentation) or it may consist of content served internally within the organization (e.g. a list of claims or recent transactions which warrant investigation routed by MPS to internal claims review or other investigatorial personnel). MPS 211 provides this functionality as follows:

- MPS 211 includes the ability to manage the display of presentations through:
  - XML documents that embody the rules and calculations to determine which presentations (and which HTML) to display in relation to a particular customer or event;
  - Management of a diverse range of presentations contained in the repository, with each possible presentation having:
    - An ID;
    - An XHTML segment for displaying the presentation; and,
    - An SQL statement for suppressing the presentation in circumstances where the user wishes to not run a presentation otherwise suggested by the results of a data mining model (e.g. to reflect recent events not reflected in the model such as an offer to purchase a certificate of deposit if a customer has just purchased a certificate of deposit);
  - Formatting information for the score. For example, if it is a simple score, a user may wish to display the score as a percentage or as a number from 1 of 5. Complex rules systems require enough formatting information to produce an HTML table from the complex rules system;
  - Management of the process through which feedback is obtained, logged, and analyzed in response to the use of presentations, including:
    - Whether to implement a feedback procedure in conjunction with the Presentation;
    - The manner of implementing the feedback procedure; and,
    - HTML to support the selected feedback mechanism;
- MPS 211 also enables a user to incorporate a number of different presentation options or alternatives into a presentation and to define the rules for selecting from among these alternative presentation options, including:
  - Ordering and filtering presentation types (e.g. on a top n basis) to permit optimization based on incorporation of multiple data mining models through the calculation of combined scores and then selecting the presentation defined for the best combined score or combination of scores;
- MPS 211 also provides for combination of data mining models into combined scores, for example, for use in situations where an organization wishes to assess the best possible outcome (e.g. a best offer to a customer) in circumstances where multiple variables and multiple data mining models influence the determination of this best offer and in other areas where rules based optimization of presentations is desired, through permitting the computation of combined scores, new scores, and other presentation constants by calculating these values from the data mining models stored in the model repository.

In this manner, MPS 211 provides for the following:

Simple presentations (i.e. presentations with one presentation option only, based on one data mining model or combination of data mining models). For example, consider the situation where a telecommunications customer with high profitability is showing a high likelihood of defection and is interacting with a call center representative. A presentation may be delivered via HTML to the call center representative at the time of interaction suggesting a lower cost or longer term program to address the risk of defection;

Ranges based presentations (i.e. presentations with several presentation options, each of which is based on a range of scores contained in one data mining model or a combination of data mining models); and, Complex presentations. That is, presentations with several presentation options, based on a range of scores contained in a data mining model or data mining models together with any number of defined attributes (e.g. data values, which can be text, numeric, dates or other simple data types, such as age, gender, product ownership, etc.) that are looked up in real time while actions, transactions and interactions are occurring to assist in selecting the presentation. As part of MPS, since a complex presentation has many permutations and combinations of possible presentations associated with it, user interface components are provided representing the rules based hierarchy for presentation delivery to assist in rules formulation and rules editing. For example, a decision tree predictive model may be used to represent a rule based tree structure, and a decision tree editor may be used to formulate the rules. Each terminal node of the tree leads to a specific presentation. This approach allows the data mining provider to execute the rules to determine the correct presentation.

MPS 211 also provides for the ordering of different presentations (e.g. through tagging and sorting presentations based on model scores as "Beginning", "Sorted", or "End"). As a result, the analytic decision engine 210 provides for the following:

the application, via the scoring services API 212 within the analytic decision engine 210, of predictive models to transactional systems, for example through the reading and analysis of transactions from a message queue service, such as IBM's MQSeries™ or Microsoft's Message Queuing Service (MS MQ)™, enabling the identification of predicted outcomes (e.g. fraud, defection, best bid or other valuable knowledge relative to business decision-making);

the exposing of these scores for interrogation by MPS 211; and, the resultant serving of instructions to MPS 211 which proceed to serve appropriate HTML in the form of messages, lists, suggestions or any other defined HTML content wished to be presented to support a transaction, interaction or other action based on the scores defined and determined within SS 212 enabling the triggering of appropriate actions (e.g. routing transactions determined to have a high fraud score via SS 212 to investigators through MPS 211).

In addition, MPS 211 module types and SS 212 module types may be accessed with HTTP, COM, or SOAP interfaces. Moreover, the data mining management console 230 included with MPS 211 may provide the wizards and dialogues to enable users to direct the functionality provided by MPS and SS module types. Examples include: the importing of static or dynamic models; the interrogation of the model repository to assess the behavior and performance of such models in production environments within the digital ecosystem; the generation of reports for distribution in the form of HTML with respect to model performance; the results obtained from serving presentations based on the scoring services and presentation services modules; etc.

By enabling MPS 211 and SS 212 to be accessed with HTTP, COM, SOAP, and XML as a representative integration platform, the system allows the analytic decision engine 210 to service a wide variety of clients and servers. The analytic decision engine 210 is based on industry standards (e.g. Microsoft™ and Internet technologies, including Windows 2000™ and COM+MTS) which make the analytic decision engine 210 highly scalable. Access to the repository 220 may be accomplished via a programmatic interface that enforces accessibility rules.

In addition, the MPS 211 and SS 212 modules provide means through which relationship management, case management, exceptions based analysis, and other business processes may be managed through the incorporation of relevant data mining models and delivery of associated presentations.

For example, a "relationship manager" view may consist of the following:

A parameterized SQL query to build a list of cases (e.g. customers, claims, etc.) for each interested party;
A link to the presentation to use;
Display formatting parameters such as the following:
Does user want to display presentations in the table;
Does user want to precompute the presentations to maximize performance (refer to the "ASYS_RelManPrecomputes" table 880 in FIG. 8);
TML page expiry (determines when HTML is regenerated);
Does user want to pre-compute and store the resultant HTML; and,
Ten most likely to defect, etc.

Again referring to FIG. 2, the data mining management console 230 provides user interface components enabling data mining modelers, business analysts, and others to manage the data mining system 200. These user interface components, which may be implemented in the form of a hierarchical management console providing appropriate authorization and view screens for different individuals involved in the business process optimization, include the following features:

Wizards and dialogs to enable a user to define views and edit queries;
Batch process routines to enable the pre-computation of presentation lists;
The ability to preview other views in the data mining system (e.g. relationship manager and case presentation views); and,
The ability to administer file and referral URL locators for the management of presentations and presentations.

The analytic decision engine 210 enables the efficient management of data mining systems in a distributed computing environment. The analytic decision engine 210 includes the following functionality:

1. Provides a reusable way of displaying tabular data on the browser;
2. Avoids frequent refreshes from the web server for small to medium sized reports thus increasing performance; and,
3. Provides these reports as XML data so that these reports are available long after the transactional data has been purged These functions make use of industry standards (e.g. XML) to interoperate with generally available browser solutions (e.g. Internet Explorer™). Documents incorporated in the data mining system may be formatted based on XML standards and served in this format. Optimizations and transformations may be implemented with these standards. Since transformations are performed in the browser, performance is improved.

The analytic decision engine 210 also incorporates reporting functions to enable users to assess and monitor the performance of data mining models in operational environments. The primary components of the data mining management console 230 that provide reporting functions are as follows:

1. Stored procedures generate reports and return report data as ADO recordsets;
2. ASP pages generate the XML from these recordsets and store them in the data mining repository 220; and,
3. Generic client side viewer ASP pages and generic client side viewer XSL scripts are used to enable the configuration of reporting systems and the display of reports on any browser.

The data mining management console 220 also includes the following functionality:

The ability to provide page displays on the browser in a customizable manner with support for standard "skins" as frames for reports or to fully customize the "look and feel" of page displays at or following initial installation and configuration; and,
Optimizations to support processes locally on the browser, rather than through server hits, when interacting with page views (e.g. by providing for sorting of records on a browser when a field header is clicked, rather than via a server side process).

Figure 9:
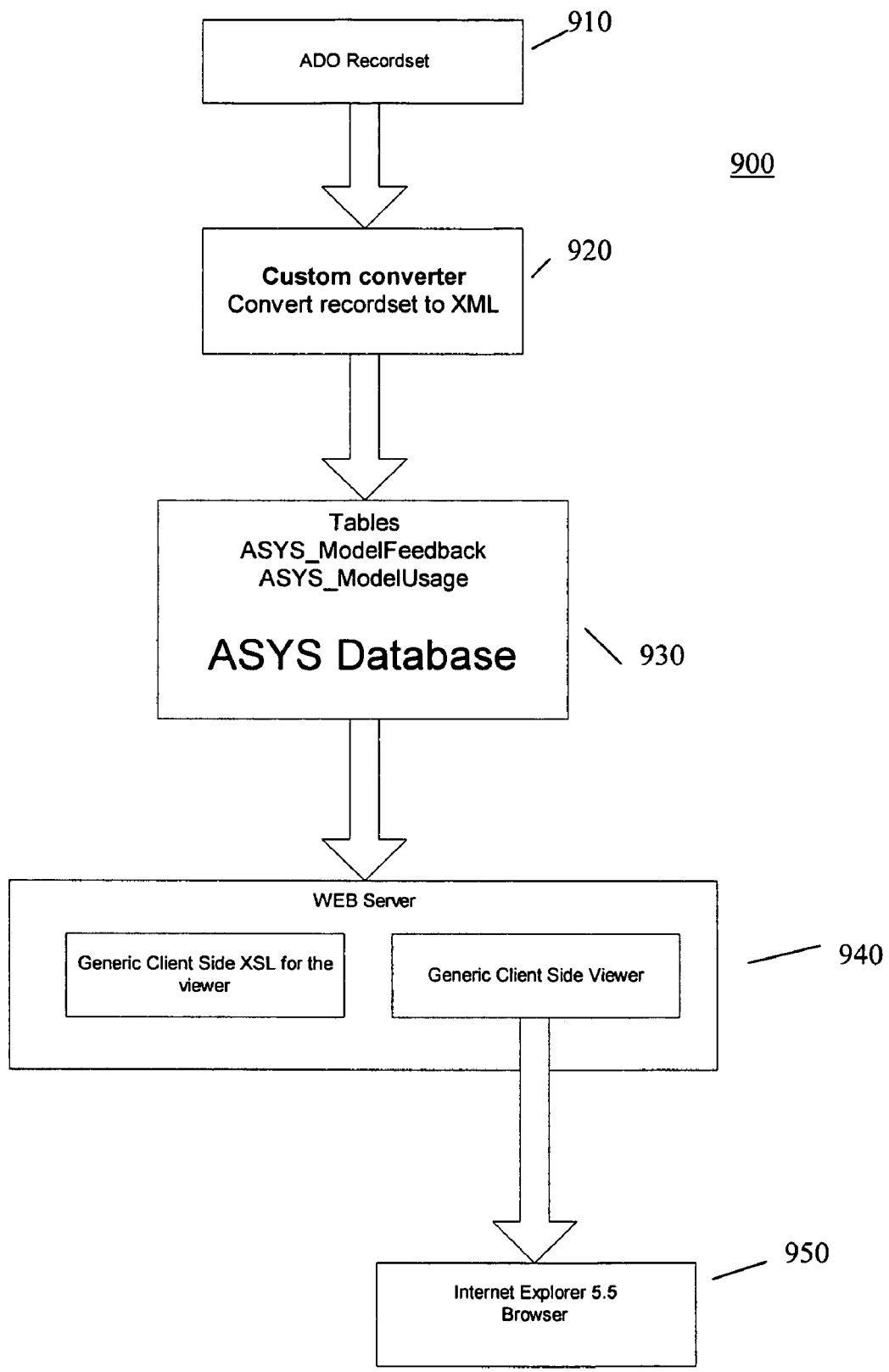

Referring to FIG. 9, there is shown a block diagram of exemplary reporting modules 900 for the analytic decision engine 210 in accordance with an embodiment of the invention. Reports provided through the data mining management console 230 may be based on information contained in the "ASYS_Feedback" table 890 forming part of the model repository 220. These reports may assess the performance of data mining models and presentations in the data mining system 200. They may also provide measures and details of when data mining models have been used and how they have performed. They may include user functions relating to statistics, measures, and sorting. In FIG. 9, an ADO recordset 910 is converted to XML 920 which is stored in the repository 220 (e.g. ASYS_ModelFeedback 890 and ASYS_ModelUsage 891). This information may then be delivered to a web server 940 and viewed using a browser 950.

For example, one reporting function provided by the analytic decision engine 210 is a distribution report, which provides statistics on the types and performance of data mining models stored in the repository 220. Fields included in this report may include the following:

Model ID;

Model Description;

Average Score. This is the average score for the model. Data from multiple reports of the same kind can be used to see if the model performance is degrading over a period of time or improving;

Standard Deviation Score;

Cardinality of the Score. This would be the number of distinct scores for the model; and, Number of missing scores The generation of this report may be provided through stored procedures (e.g. ASYS_sp_GenModelScoreDistReport).

Integration of Analytic Decision Engine with Desktop Clients. The integration of data mining models and presentations with user interfaces and other presentation environments contained in traditional client-server (i.e. "thick client") and browser-server (i.e. "thin client") applications, running on a variety of different operating systems in a plurality of different personal computer, PDA, and other appliances, will now be described with reference to FIGS. 5 (a) through 7(c).

Referring to FIG. 5(a), there is shown a block diagram illustrating the integration 500a of a traditional client-server or "thick" desktop application with the analytic decision engine 210 in accordance with an embodiment of the invention. This integration may be accomplished through the use of a browser ActiveX™ control embedded in the application which is configured to determine (i.e. through the data mining system 200) and display a presentation. Referring to FIGS. 2, 3, and 5(a), desktop applications 320 running on personal computers may gain access to the analytic decision engine 210 using a browser ActiveX™ control that is included as a standard component of Microsoft™ Internet Explorer™ (i.e. version 4 or 5) ("IE"). For non-IE environments, the analytic decision engine 210 may be configured to support the Mozilla™ browser which is an open source implementation of the Netscape™ browser. These controls may be distributed to users who do not have or want IE. Once the browser ActiveX™ control is placed in a desktop application 320, a user may communicate with the presentation services 211 by navigating to the correct URL (uniform resource locator). As such, the same solution may service both thin and desktop applications.

Moreover, a user may employ HTTP 330 to communicate with the analytic decision engine 210. The following are example URLs for static models, dynamic models, and mixed static and dynamic models, respectively:

http://ScoreServer/Score.asp?EntityID=123
&PresentationID=MyPres http://ScoreServer/
Score.asp?Age=12&Sex=M&PresentationID=MyPres http://ScoreServer/
Score.asp?Age=12&Sex=M&EntityID=123&Presentation
ID=MyPres Referring to FIG. 5(b), there is shown a block diagram illustrating an interface suggestion applet 500b in accordance with an embodiment of the invention. This is an example of desktop application integration, as illustrated in FIG. 5(a), with reference to the Siebel™ "Call Center" application which is a traditional client-server application developed by a third party software developer.

Referring to FIG. 5(c), there is shown a screen capture of an interface suggestion applet 500c in accordance with an embodiment of the invention. This is an example drawn from the Siebel™ Call Center application as illustrated in FIG. 5(b). The screen capture 500c illustrates the analytic decision engine's 210 suggestion applet 500b running in a standard "customer relationship management" software application, namely, the Siebel™"Call Center" environment. In this example, a customer service representative user ("CSR") is provided with dynamic suggestions with respect to the best offer to make to the customer, who the CSR may be currently interacting with, based on the use of the analytic decision engine 210 to deliver data mining model outputs and associated presentations (in this case a customer offer) to the CSR.

The analytic decision engine 210 supports this form of integration with a wide variety of different enterprise applications developed using industry standard development tools and programming languages (e.g. Microsoft™ Visual C++™, Visual STUDIO™, Visual Basic™, Java™, etc.).

The analytic decision engine 210 may be integrated with software applications in a variety of ways, taking into account the method of development and deployment of the broad range of different client-server ("thick client") and web-server ("thin client") software solutions. Two of these methods, which may be illustrated with reference to the Siebel™ enterprise application platform, are via suggestion applet or pop-up window. With respect to suggestion applets, and referring to FIGS. 5(b) and 5(c), a user may employ Siebel™ tools to create suggestion applet 500b calls to the analytic decision engine 210. This suggestion applet 500b may contain the user's choice of browser ActiveX™ control and may call the presentation services 211, as described above, with additional template code. Using this approach, suggestions appear as part of the Siebel™ application. This is advantageous when data mining forms part of development specifications or when major changes are being made to the Siebel™ application.

Referring to FIG. 6(a), there is shown a block diagram of the integration via pop-up window 600a of an application with the data mining system 200 in accordance with an embodiment of the invention. Here, the application integrates with the data mining system 200 through the use of a pop-up window 600a working within the application to display a presentation. The pop-up window 600a may be automatically invoked either by the user (e.g. by moving a mouse pointer to a designated icon in the application), on an automated basis without user action or intervention, or on an automated basis in response to a specific action or constraint. Referring to FIG. 6(b), there is shown a block diagram of the integration via pop-up window 600b within the Siebel "Call Center" application in accordance with an embodiment of the invention. Here, the user's position within the application is monitored by the data mining system 200. If the user's current position is bound to a presentation (i.e. determined by interrogating the data mining system), then the pop-up window containing the presentation is automatically invoked. In addition, the data mining system enables changes in bindings for presentations without coding changes through the updating of database tables in the data mining system.

In other words, and referring to FIGS. 6(a) and 6(b), the suggestion window may be a pop-up window 600a. In this case, the application monitor 610b shown in FIG. 6(b) polls the Siebel application every second or two. When the user enters an area that warrants a suggestion, a window pops up. Where and when the window is popped up is managed via the data mining management console 230 as described above. This approach has the advantage that new suggestions may be added to various locations without Siebel™ repository changes (i.e. except, of course, for a simple initial change). This embodiment is advantageous for adding data mining capabilities to existing applications and for deploying predictive intelligence out to business users "on their terms" and through the interfaces that they are comfortable with. The embodiment has the following additional advantages: predictive models and related score defined presentations may be deployed across all Siebel™ applications in a common and consistent manner; there is no disruption to the Siebel™ data model or operational environment; and, outcomes may be moved directly to the analytic data mart for analysis, iteration, and optimization. The embodiment also includes the following advantageous features: platform independent; database independent; data mining and modeling tool independent; easy to implement and rapidly deploy; easy to manage and monitor at both business and technical levels; and, easy to implement from a training perspective because front office customer facing personnel and customer touching CSRs are presented (i.e. through their browsers or other appliances) with content and outcomes only. Moreover, the analytic decision engine 210 remains CRM platform and CRM interface agnostic. The analytic decision engine 210 may support deployment of predictive intelligence to legacy environments, other CRM application platforms, and point solutions designed to fulfill defined requirements of an organization's CRM business and technology plans not addressed by Siebel™ or other similar third party CRM application vendors.

Referring to FIG. 7(a), there is shown a flow chart 700a of thin client server integration with the web server 260 in accordance with an embodiment of the invention. Here, the integration enables the delivery of HTML defined by the data mining system 200 (e.g. a personalized web page). At step 710a, a page is requested. At step 720a, a web server 260 receives the request and assembles the content. At step 730a, the web server 260 calls the ADE server 210 and passes inputs including customer ID and presentation locator. At step 740a, the ADE 210 computes the HTML for the presentation. At step 750a, the web server 260 embeds the HTML in the presentation and returns the page. At step 760a, the process ends or begins again.

Referring to FIG. 7(b), there is shown a block diagram of frame based thin client server integration 700b in accordance with an embodiment of the invention. Here, the method illustrated in the flow chart 700a of FIG. 7(a) is implemented by reference to communication between the browser (i.e. client) and the web server hosting the data mining system 200.

Data Mining Repository and Data Mining Management Console. Again referring to FIG. 8, the data mining repository 220 stores data relating to the analytic decision engine's 210 scoring services 212 and presentation 211 modules. This repository 220 includes the following:

Simple and complex "Scores"; "Presentations" (or instructions for locating such Presentations), including related presentation rules, which may be any number of different HTML based forms of documentation, links, instructions, images or other content determined to be or desired to be associated with scores contained in the model repository; "Constraints" being any one or more user defined or system defined rules, rules system or constraints which supplement data mining defined predictive model scores, rules and rules sets with other user defined or system defined rules and rules sets to manipulate the manner in which Presentations based on Scores are used or not used; and, "Outcomes", which may be numeric or text based and which are associated with the serving of one or more Presentations through time as described above for purposes of assessing and monitoring the performance of the system;

Conversion utilities for converting proprietary data mining models (e.g. SAS™ models) operating in production environments into XML documents to support applications consuming predictive models on a vendor, platform, and system neutral basis;

Support for the use of any combination of static or dynamic models or scores, together with composites thereof and other user defined constraints and rules as inputs in the analytic decision engine rules engine;

Support for the integration of scores with user defined presentations to be served in connection with any person to person, person to system, or system to system interaction in the form of HTML, together with related optimization capabilities enabling the monitoring of results from the deployment of such models, scores and/or presentations to enable the continuous improvement of the capabilities of the system; and, An architecture suitable for a wide range of computing platforms and based on highly scalable industry standard technologies to enable the convenient implementation of the invention (i.e. availability of COM and SOAP interfaces for cross-platform implementation; use of COM+MTS, HTTP, and XML for high scalability; client side JavaScript™ libraries to call the scoring server for dynamic adjustment to HTML forms and content based on model results).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A data mining system for delivering presentations associated with data mining models, said data mining system comprising:

a repository to store said data mining models, customer attributes, and presentation definitions;

means to edit said data mining models, said presentation definitions, and said customer attributes;

means to generate a presentation to deliver to a customer system; wherein said means to generate includes an analytic decision engine system including model presentation services and scoring services modules; and, means to receive inputs from said customer system and to deliver said presentation to said customer system;

wherein said inputs include a customer identification and a presentation definition identification;

wherein said means to generate selects a presentation definition using said presentation definition identification and selects a customer attribute using said customer identification;

wherein said presentation definition includes a reference to a data mining model and one or more rules; and, wherein said means to generate applies said data mining model and said one or more rules to said customer attribute to produce an outcome for display in said presentation according to a format included in said presentation definition.

2. The system of claim 1 wherein said data mining models include one or more of simple scores, complex scores, static scores, dynamic scores, rules, rules sets, and rules systems.

3. The system of claim 1 wherein said presentation definitions include defined sets of content including one or more of references to said data mining models, scores, rules, said customer attributes, activity suggestions, to do lists, pop-up windows, HTML segments, and XML scripts.

4. The system of claim 1 wherein said presentations include one or more of simple presentations, range based presentations, and complex presentations.

5. The system of claim 1 wherein said repository is a database having a database schema and a database management system.

6. The system of claim 1 wherein said means to edit said data mining models, said presentation definitions, and said customer attributes includes a data mining console system.

7. The system of claim 1 wherein said means to edit said data mining models, said presentation definitions, and said customer attributes includes one or more of text editors, scripting tools, web development tools, and HTML editors.

8. The system of claim 1 wherein said means to receive inputs from said customer system and to deliver said presentations to said customer system includes a network.

9. The system of claim 1 wherein said customer system includes one or more data mining management consoles integrated with or connected over a network.

10. The system of claim 1 wherein said customer system includes one or more applications running on a computer, system, or other appliance integrated with or connected over a network.

11. The system of claim 1 wherein said customer system includes one or more thin or thick clients in a client-server or browser-server environment integrated with or connected over a network.

12. The system of claim 1 wherein said inputs include one or more of said customer attributes.

13. The system of claim 12 wherein said data mining system includes one or more reporting systems.

14. The system of claim 13 wherein said reporting systems include one or more of outcome monitoring systems and presentation usage monitoring systems.

15. The system of claims 14 wherein said reporting systems provide one or more of said inputs.

16. The system of claim 1 wherein said data mining system includes one or more of servers, memory devices, processing units, input devices, output devices, and display devices.

17. The system of claim 8 wherein said network is an Internet network.

18. A method for generating presentations of outcomes associated with data mining models for display on a display screen, comprising:

storing one or more presentation definitions in a repository; wherein the presentation definitions contain one or more rules, one or more references to data mining models, and one or more references to customer attributes; wherein the presentation definitions have respective formatting information for formatting presentations of outcomes; wherein the customer attributes are name-value pairs; wherein the data mining models generate scores based on one or more of the customer attributes; and, wherein the rules are for branching on one or more of the scores and the customer attributes to choose between outcomes;

receiving a request for a presentation for an outcome, the request including a presentation definition identification and one or more of a customer identification and one or more customer attributes; wherein the presentation definition identification is a key to a presentation definition stored in the repository; and, wherein the customer identification is a key to one or more customer attributes stored in the repository;

in response to the request, retrieving a presentation definition from among the one or more presentation definitions using the presentation identification and retrieving one or more of the customer attributes from the repository using the customer identification;

generating one or more scores from the data mining models referenced by the presentation definition using one or more of the customer attributes provided by the request or retrieved from the repository;

determining the outcome by applying one or more rules in the presentation definition to one or more of the scores and the customer attributes; and, formatting the presentation for the outcome for display on the display screen using the formatting information contained in the presentation definition.

19. The method of claim 18 wherein the data mining models are one or more of a logistic regression, a decision tree, a neural network, a Bayesian network, a linear regression, a cluster model, a K-Means cluster model, an expectation maximizing cluster model, and an association rule.

20. The method of claim 18 wherein the customer attributes are one or more of age information and sex information.

21. The method of claim 18 wherein the formatting information is markup language formatting information.

22. The method of claim 18 and further comprising importing the data mining models and presentation definitions into the repository.

23. The method of claim 18 and further comprising receiving updated data mining models and updated presentation definitions to replace the data mining models and presentation definitions in the repository.

24. The method of claim 18 and further comprising receiving the one or more rules for the presentation definition.

25. The method of claim 18 wherein the scores are one or more of simple scores, complex scores, static scores, and dynamic scores.

26. The method of claim 18 wherein the outcomes provide one or more of defined sets of content, data mining model scores, activity suggestions, to-do lists, pop-up windows, HTML segments, extensible markup language (XML) scripts, and sets of computer instructions.

27. The method of claim 18 wherein the outcomes are one or more of simple messages, range based messages, and complex messages.

28. The method of claim 18 wherein the request is received over a network.

29. The method of claim 28 wherein the network is an Internet network.

* * * * *